US011569527B2

(12) United States Patent
Hu et al.

(10) Patent No.: US 11,569,527 B2
(45) Date of Patent: Jan. 31, 2023

(54) LITHIUM BATTERY

(71) Applicant: UNIVERSITY OF MARYLAND, COLLEGE PARK, College Park, MD (US)

(72) Inventors: Liangbing Hu, Rockville, MD (US); Eric D. Wachsman, Fulton, MD (US); Boyang Liu, Columbia, MD (US); Lei Zhang, Berwyn Heights, MD (US); Shaomao Xu, College Park, MD (US); Dennis McOwen, Washington, DC (US); Chunpeng Yang, Berwyn Heights, MD (US)

(73) Assignee: University of Maryland, College Park, College Park, MD (US)

( * ) Notice: Subject to any disclaimer, the term of this patent is extended or adjusted under 35 U.S.C. 154(b) by 122 days.

(21) Appl. No.: 16/830,285

(22) Filed: Mar. 26, 2020

(65) Prior Publication Data
US 2020/0313227 A1 Oct. 1, 2020

Related U.S. Application Data

(60) Provisional application No. 62/833,245, filed on Apr. 12, 2019, provisional application No. 62/823,997, filed on Mar. 26, 2019.

(51) Int. Cl.
H01M 10/0525 (2010.01)
H01M 10/0566 (2010.01)
(Continued)

(52) U.S. Cl.
CPC ..... *H01M 10/0525* (2013.01); *H01M 4/1393* (2013.01); *H01M 4/382* (2013.01);
(Continued)

(58) Field of Classification Search
CPC ..... H01M 4/382; H01M 50/434; H01M 50/46
See application file for complete search history.

(56) References Cited

U.S. PATENT DOCUMENTS 4,582,621 A 4/1986 Bell et al.
4,957,673 A 9/1990 Shroeder et al.
(Continued)

FOREIGN PATENT DOCUMENTS

CN 1333576 1/2002
CN 101933100 12/2010
(Continued)

OTHER PUBLICATIONS

Liu, Boyang et al., "3D lithium metal anodes hosted in asymmetric garnet frameworks toward high energy density batteries," Energy Storage Materials vol. 14, Sep. 2018, pp. 376-382, Available online Apr. 13, 2018.

(Continued)

*Primary Examiner* — Stephan J Essex
(74) *Attorney, Agent, or Firm* — Honigman LLP; Andrew N. Weber; Jonathan P. O'Brien

(57) ABSTRACT

The present disclosure describes various types of batteries, including lithium-ion batteries having an anode assembly comprising: an anode comprising a first porous ceramic matrix having pores; and a ceramic separator layer affixed directly or indirectly to the anode; a cathode; an anode-side current collector contacting the anode; and anode active material comprising lithium located within the pores or cathode active material located within the cathode; wherein, the ceramic separator layer is located between the anode and the cathode, no electrically conductive coating on the pores contacts the separator layer, and in a fully charged state, lithium active material in the anode does not contact the
(Continued)

separator layer. Also disclosed are methods of making and methods of using such batteries.

18 Claims, 23 Drawing Sheets

(51) Int. Cl.
| | | |
|---|---|---|
| *H01M 4/1393* | (2010.01) | |
| *H01M 10/0565* | (2010.01) | |
| *H01M 4/38* | (2006.01) | |
| *H01M 50/46* | (2021.01) | |
| *H01M 50/431* | (2021.01) | |
| *H01M 50/434* | (2021.01) | |

(52) U.S. Cl.
CPC ... *H01M 10/0565* (2013.01); *H01M 10/0566* (2013.01); *H01M 50/434* (2021.01); *H01M 50/46* (2021.01)

(56) References Cited

U.S. PATENT DOCUMENTS

| | | | |
|---|---|---|---|
| 5,294,503 A | 3/1994 | Huang et al. | |
| 5,342,710 A | 8/1994 | Koksbang | |
| 5,434,021 A | 7/1995 | Fauteux | |
| 5,580,430 A | 12/1996 | Balagopal et al. | |
| 5,589,296 A | 12/1996 | Iwamoto et al. | |
| 5,894,656 A | 4/1999 | Menon et al. | |
| 6,218,049 B1 | 4/2001 | Bates | |
| 6,447,712 B1 | 9/2002 | Dogan | |
| 6,940,628 B2 | 9/2005 | Giron et al. | |
| 7,060,205 B2 | 7/2006 | Monden et al. | |
| 7,070,632 B1 | 7/2006 | Visco | |
| 7,713,466 B2 | 5/2010 | Omori et al. | |
| 8,304,115 B1 | 11/2012 | Petkov | |
| 8,940,446 B1 | 1/2015 | Holme | |
| 9,252,455 B1 | 2/2016 | Lin | |
| 9,548,512 B2 | 1/2017 | Liang | |
| 9,590,228 B1 | 3/2017 | Wang et al. | |
| 10,622,666 B2 | 8/2020 | Wachsman | |
| 10,971,761 B2 | 4/2021 | Hu | |
| 2002/0136945 A1 | 9/2002 | Call | |
| 2002/0182508 A1 | 12/2002 | Nimon et al. | |
| 2003/0190520 A1 | 10/2003 | Amine | |
| 2004/0096737 A1 | 5/2004 | Kin et al. | |
| 2004/0191617 A1 | 9/2004 | Visco | |
| 2005/0008938 A1 | 1/2005 | Cho | |
| 2005/0175900 A1 | 8/2005 | Yasuda et al. | |
| 2006/0026813 A1 | 11/2006 | Seabaugh et al. | |
| 2007/0048617 A1 | 3/2007 | Inda | |
| 2007/0138020 A1 | 6/2007 | Balagopal et al. | |
| 2007/0148553 A1 | 6/2007 | Weppner | |
| 2008/0118826 A1 | 5/2008 | Shimamura | |
| 2008/0118836 A1 | 5/2008 | Hwang | |
| 2008/0138710 A1 | 6/2008 | Liaw et al. | |
| 2008/0182147 A1 | 7/2008 | Blake | |
| 2008/0241665 A1 | 10/2008 | Sano | |
| 2008/0286625 A1 | 11/2008 | Sarker et al. | |
| 2009/0061313 A1 | 3/2009 | Tadano | |
| 2009/0136830 A1 | 5/2009 | Gordon | |
| 2009/0197182 A1 | 8/2009 | Katoh | |
| 2009/0226790 A1 | 9/2009 | Kanamura | |
| 2009/0226816 A1 | 9/2009 | Yoshida | |
| 2010/0216032 A1 | 8/2010 | Baba | |
| 2010/0308253 A1 | 12/2010 | Swift | |
| 2010/0331170 A1 | 12/2010 | Balagopal | |
| 2011/0104526 A1 | 5/2011 | Boxley et al. | |
| 2011/0149473 A1 | 6/2011 | Eilertsen | |
| 2011/0206980 A1 | 8/2011 | Yerramalli | |
| 2011/0244337 A1 | 10/2011 | Ohta | |
| 2012/0021297 A1 | 1/2012 | Hauser | |
| 2012/0199785 A1 | 8/2012 | Saka | |
| 2012/0264017 A1 | 10/2012 | Nazri et al. | |
| 2013/0004830 A1 | 1/2013 | Song | |
| 2013/0202960 A1 | 8/2013 | Kim et al. | |
| 2013/0216903 A1 | 8/2013 | Pitteloud | |
| 2013/0216910 A1 | 8/2013 | Obrovac | |
| 2013/0260257 A1 | 10/2013 | Choi | |
| 2013/0295469 A1 | 11/2013 | Liang et al. | |
| 2013/0323603 A1 | 12/2013 | Ryu | |
| 2014/0038054 A1 | 2/2014 | Tojigamori | |
| 2014/0080006 A1 | 3/2014 | Ogasa | |
| 2014/0170465 A1 | 6/2014 | Visco et al. | |
| 2014/0223730 A1 | 8/2014 | Larsen | |
| 2014/0272595 A1 | 9/2014 | Cristadoro | |
| 2014/0287305 A1* | 9/2014 | Wachsman | H01M 10/054 429/211 |
| 2014/0299820 A1 | 10/2014 | Harandek et al. | |
| 2015/0044575 A1 | 2/2015 | Kawaji | |
| 2015/0056519 A1 | 2/2015 | Ohta | |
| 2015/0056520 A1 | 2/2015 | Thokchom | |
| 2015/0064537 A1 | 3/2015 | Christensen | |
| 2015/0099188 A1 | 4/2015 | Holme | |
| 2015/0099190 A1 | 4/2015 | Holme | |
| 2015/0111110 A1 | 4/2015 | Watanabe et al. | |
| 2015/0147659 A1 | 5/2015 | Kato | |
| 2015/0229000 A1 | 8/2015 | Shao et al. | |
| 2015/0311562 A1 | 10/2015 | Le Van-Jodin | |
| 2016/0028103 A1 | 1/2016 | Yokoyama | |
| 2016/0167132 A1 | 6/2016 | Panat | |
| 2016/0204427 A1 | 7/2016 | Vereecken | |
| 2016/0351973 A1 | 12/2016 | Albano | |
| 2016/0372729 A1 | 12/2016 | Archer | |
| 2017/0005367 A1 | 1/2017 | Van Berkel | |
| 2017/0022112 A1 | 1/2017 | Karpenko | |
| 2017/0098824 A1 | 4/2017 | Fasching | |
| 2017/0162911 A1 | 6/2017 | Gaben | |
| 2017/0288232 A1 | 10/2017 | Herle | |
| 2018/0102571 A1 | 4/2018 | Sakamoto | |
| 2019/0058217 A1 | 2/2019 | Ahn | |
| 2020/0028156 A1* | 1/2020 | Zhang | H01M 10/052 |
| 2020/0243870 A1 | 7/2020 | Wachsman et al. | |
| 2020/0358086 A1 | 11/2020 | Hu et al. | |

FOREIGN PATENT DOCUMENTS

| | | |
|---|---|---|
| CN | 103313937 | 9/2013 |
| CN | 105636921 | 6/2016 |
| CN | 106165154 | 11/2016 |
| EP | 2099087 | 9/2009 |
| EP | 3753034 | 12/2020 |
| JP | 60-001768 | 1/1985 |
| JP | 11-283664 | 10/1999 |
| JP | 2000100471 | 4/2000 |
| JP | 2001-076533 | 3/2001 |
| JP | 2004-063397 | 2/2004 |
| JP | 2006-260887 | 9/2006 |
| JP | 2008-226666 | 9/2008 |
| JP | 2008-251225 | 10/2008 |
| JP | 2009-054455 | 3/2009 |
| JP | 2009-181920 | 8/2009 |
| JP | 2009-238739 | 10/2009 |
| JP | 2009-259696 | 11/2009 |
| JP | 2010-015782 | 1/2010 |
| JP | 2010-108810 | 5/2010 |
| JP | 2010-202499 | 9/2010 |
| JP | 2010-218686 | 9/2010 |
| JP | 2013-008671 | 1/2013 |
| JP | 2014-072009 | 4/2014 |
| JP | 2014-096350 | 5/2014 |
| WO | 2008059987 | 5/2008 |
| WO | 2009108184 | 9/2009 |
| WO | 2013140565 | 9/2013 |
| WO | 2013161310 | 10/2013 |
| WO | 2014010043 | 1/2014 |
| WO | 2014153534 | 9/2014 |
| WO | 2016010371 | 1/2016 |
| WO | 2016057426 | 4/2016 |
| WO | 2016069749 A1 | 5/2016 |
| WO | 2016069749 A8 | 5/2016 |
| WO | 2016094651 | 6/2016 |
| WO | 2017116599 | 7/2017 |
| WO | 2017190135 | 11/2017 |

(56) References Cited

FOREIGN PATENT DOCUMENTS

| WO | 2018068034 | 4/2018 |
|---|---|---|
| WO | 2018184007 | 10/2018 |
| WO | 2018184010 | 10/2018 |
| WO | 2019160993 | 8/2019 |

OTHER PUBLICATIONS

Xu, S. et al., "Three-Dimensional, Solid-State Mixed Electron-Ion Conductive Framework for Lithium Metal Anode," Nano Letters 2018, 18, 6, 3926-3933, May 22, 2018.

Yang, C. et al., "Continuous plating/stripping behavior of solid-state lithium metal anode in a 3D ion-conductive framework," PNAS, Apr. 10, 2018, vol. 115, No. 15, pp. 3770-3775.

Hua Xie, et al., "Amorphous-Carbon-Coated 3D Solid Electrolyte for an Electro-Chemomechanically Stable Lithium Metal Anode in Solid-State Batteries", Nano Lett. 2021, 21, pp. 6163-6170.

PCT International Search Report and Written Opinion from PCT/US2014/031492 dated Aug. 11, 2014.

PCT International Preliminary Report on Patentability (Chapter I) with Written Opinion from PCT/US2014/031492.

PCT International Search Report and Written Opinion from PCT/US2019/018349 dated May 2, 2019.

PCT International Preliminary Report on Patentability (Chapter I) with Written Opinion from PCT/US2019/018349.

PCT International Preliminary Report on Patentability (Chapter I) with Written Opinion from PCT/US2013/061660.

PCT International Search Report and Written Opinion from PCT/US2015/057824 dated Jan. 19, 2016.

PCT International Preliminary Report on Patentability (Chapter I) with Written Opinion from PCT/US2015/057824.

PCT International Search Report and Written Opinion from PCT/US2017/030407 dated Jul. 7, 2017.

PCT International Preliminary Report on Patentability (Chapter I) with Written Opinion from PCT/US2017/030407.

PCT International Search Report and Written Opinion from PCT/US2017/060421 dated May 7, 2019.

PCT International Preliminary Report on Patentability (Chapter I) with Written Opinion from PCT/US2017/060421.

PCT International Search Report and Written Opinion from PCT/US2018/025289 dated Jul. 26, 2018.

PCT International Preliminary Report on Patentability (Chapter I) with Written Opinion from PCT/US2018/025289.

PCT International Search Report and Written Opinion from PCT/US2013/061660 dated Feb. 24, 2014.

\* cited by examiner

Supporting Information

SUPPORTING INFORMATION

LITHIUM BATTERY

CROSS-REFERENCE TO RELATED APPLICATIONS

This application claims the benefit of U.S. Provisional Appl. No. 62/823,997 filed on Mar. 26, 2019 and U.S. Provisional Appl. No. 62/833,245 filed on Apr. 12, 2019, the disclosures of which are incorporated herein by reference in their entireties.

GOVERNMENT SUPPORT

This invention was made with government support under DEAR0000384 awarded by DOE ARPA-E and under DEEE0006860 awarded by DOE. The government has certain rights in the invention.

TECHNICAL FIELD

This disclosure relates to batteries including lithium batteries, solid state batteries and hybrid batteries.

BACKGROUND

Lithium batteries and other batteries have a risk of dendrite formation and a risk of short-circuiting. It is desirable to produce a battery with reduced risk of dendrite formation and/or risk of short-circuiting.

SUMMARY

In a first aspect disclosed herein, a lithium-ion battery is provided. The lithium-ion battery comprises: an anode assembly comprising: an anode comprising a first porous ceramic matrix having pores; and a ceramic separator layer affixed directly or indirectly to the anode; a cathode; an anode-side current collector contacting the anode; and anode active material comprising lithium located within the pores or cathode active material located within the cathode; wherein, the ceramic separator layer is located between the anode and the cathode, no electrically conductive coating on the pores contacts the separator layer, and in a fully charged state, lithium active material in the anode does not contact the separator layer.

In a first embodiment of the first aspect, the anode active material is lithium.

In a second embodiment of the first aspect, the first porous ceramic matrix and the ceramic separator layer are lithium garnet.

In a third embodiment of the first aspect, the lithium-ion battery further comprises an electrically conductive coating, not the anode active material, that is present on the surface of at least a portion of the pores of the anode.

In a fourth embodiment of the first aspect, the lithium-ion battery further comprises an electrically conductive coating, not the anode active material, that is present on the surface of at least a portion of the pores of the anode and the electrically conductive coating is a carbon material.

In a fifth embodiment of a first aspect, the lithium-ion battery further comprises an electrically conductive coating, not the anode active material, that is present on the surface of at least a portion of the pores of the anode and the electrically conductive coating is a carbon material and the electrically conductive coating is selected from the group consisting of graphite, carbon black and carbon nanotubes.

In a sixth embodiment of the first aspect, the lithium-ion battery further comprises an electrically conductive coating, not the anode active material, that is present on the surface of at least a portion of the pores of the anode and the electrically conductive coating is a metal.

In a seventh embodiment of the first aspect, the lithium-ion battery further comprises an electrically conductive coating, not the anode active material, that is present on the surface of at least a portion of the pores of the anode and the electrically conductive coating is a semiconductor.

In a seventh embodiment of the first aspect, the lithium-ion battery further comprises an electrically conductive coating, not the anode active material, that is present on the surface of at least a portion of the pores of the anode and the electrically conductive coating is in electrical communication with the anode current collector when the lithium-ion battery is in a fully discharged state.

In an eighth embodiment of the first aspect, the first porous ceramic matrix and the separator layer are made integral to one another.

In a ninth embodiment of the first aspect, the first porous ceramic matrix and the separator layer are of the same ceramic material.

In a tenth embodiment of the first aspect, the cathode comprises: a second porous ceramic matrix having pores, the first porous ceramic matrix and the second ceramic matrix are of the same or different ceramic material.

In an eleventh embodiment of the first aspect, the cathode comprises a liquid or gel electrolyte.

In a second aspect disclosed herein, a method of making a lithium-ion battery is provided where the lithium-ion battery comprises: an anode assembly comprising: an anode comprising a first porous ceramic matrix having pores; and a ceramic separator layer affixed directly or indirectly to the anode; a cathode; an anode-side current collector contacting the anode; and anode active material comprising lithium located within the pores or cathode active material located within the cathode; wherein, the ceramic separator layer is located between the anode and the cathode, no electrically conductive coating on the pores contacts the separator layer, and in a fully charged state, lithium active material in the anode does not contact the separator layer. The method comprises attaching the cathode to a surface the anode assembly; attaching the anode-side current collector; attaching the cathode-side current collector; and charging the lithium-ion battery.

In a first embodiment of the second aspect, an interlayer is located between the cathode and the anode assembly.

In a second embodiment of the second aspect, an interlayer is located between the cathode and the anode assembly and the interlayer is a gel.

In a third aspect disclosed herein, a method of operating a lithium-ion battery is provided where the lithium-ion battery comprises an anode assembly comprising: an anode comprising a first porous ceramic matrix having pores; and a ceramic separator layer affixed directly or indirectly to the anode; a cathode; an anode-side current collector contacting the anode; and anode active material comprising lithium located within the pores or cathode active material located within the cathode; wherein, the ceramic separator layer is located between the anode and the cathode, no electrically conductive coating on the pores contacts the separator layer, and in a fully charged state, lithium active material in the anode does not contact the separator layer. The method comprises: charging the lithium-ion battery whereby lithium ions move from the cathode and are plated in the pores of the anode progressively from proximate the anode current collector to proximate the ceramic separator layer.

In a fourth aspect disclosed herein, a method of operating a lithium-ion battery is provided where the lithium-ion battery comprises an anode assembly comprising: an anode comprising a first porous ceramic matrix having pores; and a ceramic separator layer affixed directly or indirectly to the anode; a cathode; an anode-side current collector contacting the anode; and anode active material comprising lithium located within the pores or cathode active material located within the cathode; wherein, the ceramic separator layer is located between the anode and the cathode, no electrically conductive coating on the pores contacts the separator layer, and in a fully charged state, lithium active material in the anode does not contact the separator layer and the lithium-ion battery further comprises an electrically conductive coating, not the anode active material, that is present on the surface of at least a portion of the pores of the anode. The method comprising: charging the lithium-ion battery whereby lithium ions move from the cathode and are plated in the pores of the anode progressively from proximate the electronically conductive coating to proximate the ceramic separator layer.

DETAILED DESCRIPTION

Figure 1:
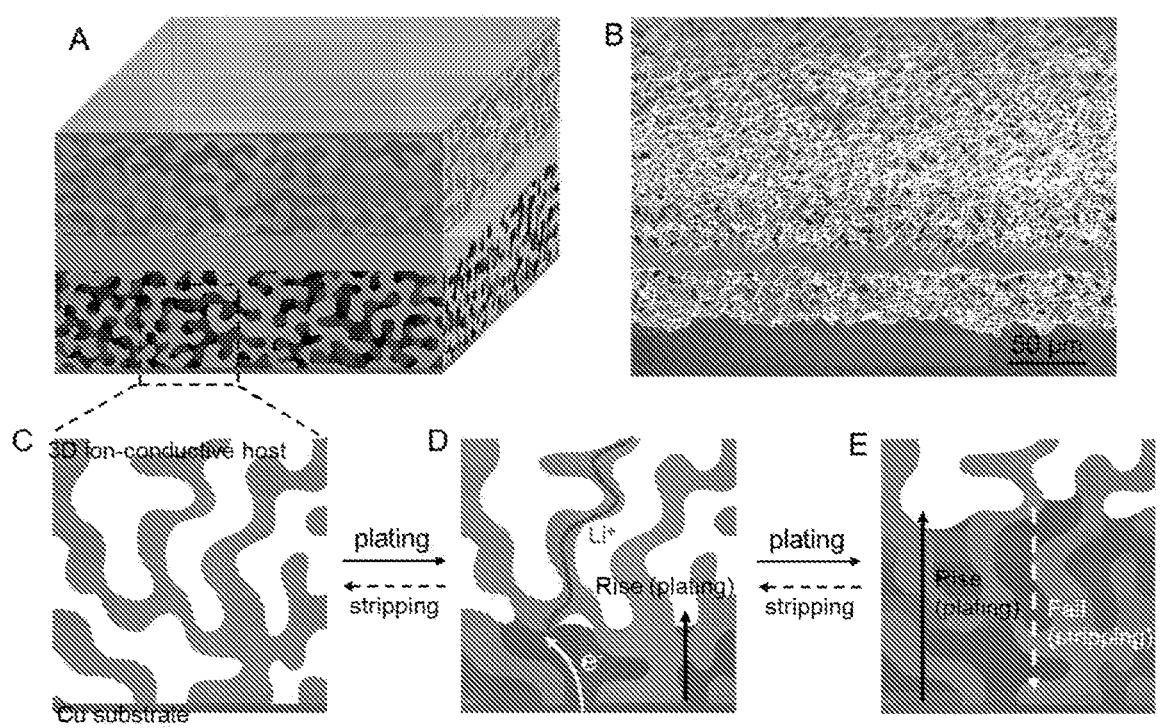
FIG. 1. Schematic for an embodiment of a process of Li plating and stripping in the 3D Li-ion-conductive host. (A) Schematic of an embodiment of a 3D ionic conductive host for studying Li-ion plating/stripping, where the upper layer is filled with the Li source and the lower layer is empty with Cu deposited on the bottom. (B) Side-view SEM image of an embodiment of a pristine 3D ionic conductive host. (C) 2D local schematic for the lower layer of an embodiment of an empty 3D host without Li. (D) Li deposited in an embodiment of a 3D ionic conductive host from an embodiment of a bottom current collector. (E) Li growth and rise in the 3D host with more Li deposited.

In the following description, numerous specific details are set forth to clearly describe various specific embodiments disclosed herein. One skilled in the art, however, will understand that the presently claimed invention may be practiced without all of the specific details discussed below. In other instances, well known features have not been described so as not to obscure the invention.

The presently disclosed subject matter relates generally to a battery system, several components of this battery system, and their methods of fabrication. The present system offers improved performance and safety to standard solid-state metal batteries. The battery system may include several components including, but not limited to, lithium metal anodes and garnet structural portions, such as separators and porous region(s). In certain embodiments, the battery system can include a 3D host that conducts ions or electrons and may be used for Li metal anodes. This 3D host may include a garnet-type Li-ion conductor with a porous-dense-porous trilayer structure or a porous-dense bilayer with a current collector that can be a conductive layer, for which many materials are suitable. Included in the present disclosure is a anode framework that may conduct electrons or ions. In some embodiments, the structure can include a cathode structure that includes a liquid as a part of the electrolyte, and this cathode structure can be combined with embodiments of anodes anode frameworks disclosed herein. The structure and method of fabrication can result in a battery system component that can offer reliable cycling performance and/or high current density, which can in some embodiments measure reach 1 $mA/cm^2$ or higher. Also, the present battery system reduces the effect or likelihood of dendrite formation. The present disclosure also can address issues associated with the contact between solid-state electrolyte materials and Li metal anodes. In one example embodiment, the present invention produces all-solid-state Li metal batteries with high energy densities and long-term stability.

Disclosed herein are batteries and battery components with solid-state electrolytes, such as ceramic Li-ion conductors, which can inhibit the formation of Li dendrites and reduce the likelihood of short-circuiting, and can have improved flammability and leak characteristics. Also disclosed are embodiments with improved or more stable contact between solid-state electrolytes and anode active materials, such as a Li metal anode, and embodiments that can reduce the change of volume of portions of the battery or battery system, such as the anode, during battery cycling. In some embodiments, improvements related to interface contact and reduction in volume change of battery components during cycling can also broaden the applicable capacity of the Li metal anodes with planar solid-state electrolytes.

The present invention includes embodiments related to a 3D ionic conductive host for Li metal anodes. In an example embodiment, the 3D ionic conductive host includes a 3D garnet-type Li-ion conductor with a porous-dense-porous trilayer (or porous-dense bilayer) structure as the Li host and a current collector (such as a coated electronic conductive layer). The trilayer (or bilayer) garnet framework can in some embodiments be fabricated by a tape-casting method and can in some embodiments be co-sintered into a combined structure. The current collector can be affixed (such as by coating) to a side of the framework by any suitable means and in particular embodiments, can be formed or adhered by e-beam evaporation or other physical vapor deposition methods or by other means of affixing or forming the current collector such that electrical conductivity occurs between the framework and the current collector. In some embodiments, Li metal anode can be filled in the porous garnet host as the anode active material by melt-infiltration method or electrochemical deposition. In some embodiments, the active material can be added to the battery as a part of a cathode, and then electroplated into the porous anode by cycling of the battery. In some embodiments, such as for a symmetric cell, the active material can be added to the region to one side of the separator and then electroplated to the other side of the separator as a Li metal. In some embodiments, cathode materials can be added directly to the region that will that will serve as a the cathode of the battery or battery system.

The materials that can serve as current collectors include but are not limited to copper, nickel, titanium, gold, and carbon. The applicable anode materials for lithium systems include, but are not limited to, lithium metal anode materials and lithium compound anode materials. The applicable cathode materials for batteries and battery systems include but are not limited to lithium compound cathode materials (e.g. $LiCoO_2$, $LiMnO_2$, $LiNi_xMn_yCo_zO_2$, $LiFePO_4$, etc.), sulfur-based cathode materials (e.g. S, $Li_xS$), oxygen or air cathodes, and other materials able to function in the battery system and combinations of these materials.

We have also invented a 3D anode frame work based on a mixed electron/ion conducting framework. The 3D anode frame work was achieved by conformal coating of an electrically conducting material that is compatible with the anode active material, such as coating a carbon material on porous garnet structure for a lithium metal anode material, which was then used as the 3D lithium host. Li was introduced into the 3D host via electrochemical deposition (or electroplating), which leads to improved coating of the lithium anode material on the garnet electrolyte material, resulting in a low resistance which in some embodiments was 25 $\Omega cm_2$. With the trilayer structure (or a bilayer structure combined with a cathode which can optionally comprise a liquid), the Li can be cycled between the 3D anode framework and the cathode infused into the cathode porous structure during battery operation (such as one or more charge and/or discharge cycles.) With the same local current density, the surface area of the porous garnet framework can result in higher overall current density with stable lithium deposition. A current density of 1 $mA/cm^2$ demonstrated with stable Li cycling during operation of the battery. Similar results can be achieved with In some embodiments of a battery or a battery system, the conformal coating of an electrical conducting material can extend from the current collector into the porous anode matrix, with the electrical conducting material extending only part-way toward the separator, or all of the way to the separator. In some embodiments, the electrically conducting material can form an electrically conductive path into the porous anode matrix. Without wishing to be limited by theory, it is believed that during a cycle where the anode active material (such as lithium metal) is plated into the porous anode matrix, the specific locations where plating occurs can be where the electrons and the active material ions are combined. Areas of the ion-conducting anode matrix that have a coating of electrical conductor electrically connected to the current collector would preferentially plate active material. In systems where no electrically conducting coating is present on the surface of the pores of the anode, the lithium (or other active material) would plate from the current collector, advancing toward the separator (and the cathode or other side of the cell) with the plated active metal acting as a current collector as the plating proceeds.

In systems where electrically conducting coating is present on the surface of the pores of the anode, the active material would plate preferentially on the areas having an electrical connection to the current collector. In systems where the electrically conducting coating is present on the surface of the pores of the anode and extends to the separator, the active material would plate on and/or adjacent to the separator early in the charging cycle. Plating on and/or adjacent to the separator can lead to increased risk of dendrite formation due to the growth plating in proximity to the separator and favorable conditions for continued deposition, such as ion concentration gradients and low electrical resistance.

In systems where electrically conducting coating is present on the surface of the pores of the anode, but the electrically conducting coating does not extend to the separator (for example, there is a gap or a band where the coating does not extend to), then active material would plate along the electrically conducting coating and would not favor growing further toward the separator, thus disfavoring dendrite formation. In some embodiments, it can also be favorable to control the current during charging of the cell in order to also disfavor plating progressing toward the separator. In addition, as explained above, the plated active material can also act as an electrical conductor and again, without wishing to be bound by theory, it is believed that under battery cycling conditions, discharging of a cell/battery does not completely remove the active material from the anode, but it is believed that a small amount of active material can be left behind, leading to increased electrical conductivity. Accordingly, it is desirable that when the active material is initially loaded into a battery or cell, the active material on the anode side, such as for a metallic active material, the active material not reach the separator.

Various methods can be used to charge the active material and to coat the pores of the anode with the electrically conducting coating to selectively fill to the separator/coat to the separator or to leave a region of unfilled/uncoated anode pore surface proximal the separator. Filling methods can include deposition techniques, liquid techniques (e.g. dissolving or suspending the active material or an active material precursor in a liquid such as a solvent or another liquid, presenting the liquid with material to the porous material, followed by conversion of material precursor), or presenting melted active material to the surface of the anode, or by charging the active material to the opposite side of the battery/cell (such as the cathode or the other side of the symmetric cell) followed by electroplating the active material to the anode. Degree of penetration can be controlled by techniques such as selection of the deposition technique, timing of the liquid contact, pretreating with a liquid to partially fill the pores prior to applying the liquid with material, application of pressure or vacuum, etc.

Coating methods can also include such methods as deposition techniques, liquid techniques (e.g. dissolving or suspending the active material or an active material precursor in a liquid such as a solvent or another liquid, presenting the liquid with material to the porous material, followed by conversion of material precursor), etc. Degree of penetration of the coating can also be controlled by techniques such as selection of the deposition technique, timing of the liquid contact, pretreating with a liquid to partially fill the pores prior to applying the liquid with material, application of pressure or vacuum, etc.

In various embodiments, batteries and cell systems and components disclosed herein offer:

High-capacity and/or improved-safety for Li metal anodes in solid-state and hybrid battery architectures.

Improved interfacial contact and reduced dendrite penetration risk of Li metal anodes.

Solid state Li metal batteries (e.g. Li-sulfur batteries and Li-air batteries) having higher energy density and improved safety.

FIGS. 1A-E are schematic drawings showing an embodiment of a process of Li plating and stripping in the 3D Li-ion-conductive host. This structure enables Li deposition only from the current collector (at the bottom pf the figure) where Li-ions from the garnet skeleton have access to electrons from the Cu or Li deposited on Cu. Therefore, plating of Li leads to rise of Li metal from the bottom (away from the current collector) Cu substrate and growth within the 3D framework and subsequent stripping leads to the fall of the Li metal (away from the separator, toward the current collector.) Because Li is reduced from solid-state Li-ions, Li metal is plated within the voids of the 3D framework free from formation of dendrites. Moreover, as plating/stripping of Li results in the rise/fall of the anode in the host structure and away from the separator layer, internal short-circuits caused by Li penetration are further averted. While copper is used in this embodiment, other materials can be used for the current collector, such as other metals, semiconductors or carbon materials (such as graphite, carbon black, carbon nano-tubes or other elemental carbon materials) and combinations of these.

In some embodiments, combinations of methods for filling or coating can be used, and in some embodiments, a portion of the active material can be added directly to the porous anode matrix and a portion can be added by electroplating from the cathode. In some embodiments, it can be desirable for the capacity of the anode to be greater than the capacity of the cathode in order to prevent overfilling the anode with active material. In some embodiments of a symmetric cell, the capacity of a side with partial electrically conducting coated pores be greater than the capacity of the other side to prevent overfilling of the side with the partial coating.

In particular, (a) is a schematic of an embodiment of a 3D ionic conductive host for studying Li-ion plating/stripping, where the upper layer is filled with the Li source and the lower layer is empty with Cu deposited on the bottom. (b) is a side-view SEM image of the pristine 3D ionic conductive host. (c) is a 2D local schematic for the lower layer of the empty 3D host without Li. (d) shows Li deposited in the 3D ionic conductive host from the bottom current collector. (e) shows Li growth and rise in the 3D host with more Li deposited.

Figure 2:
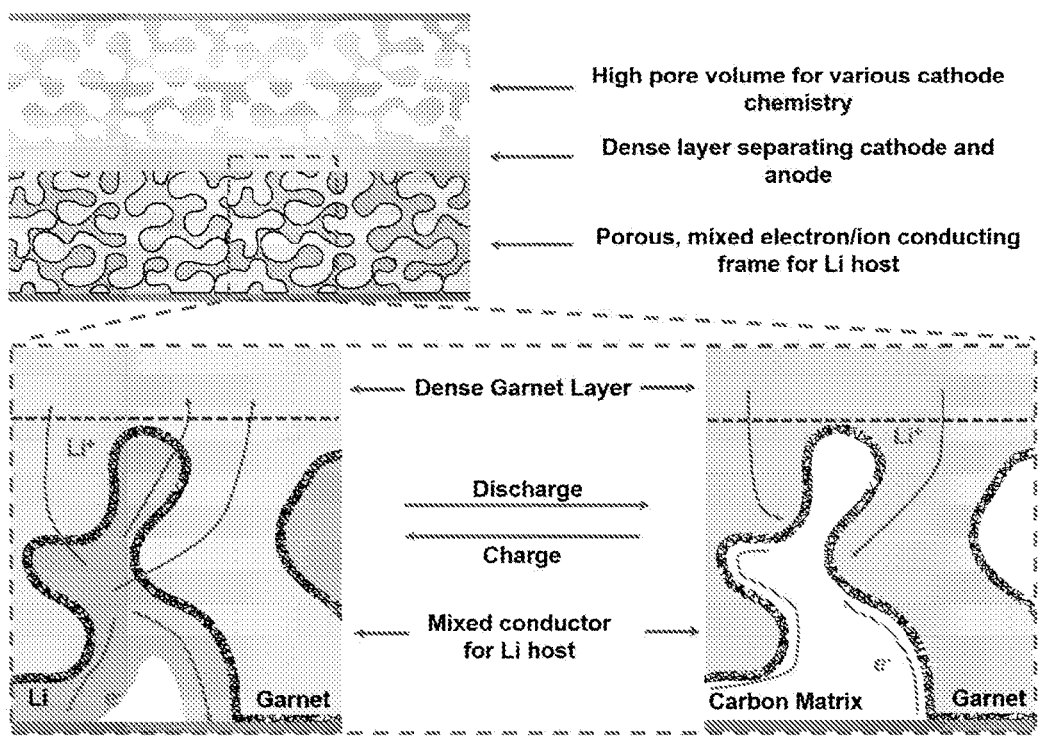
FIG. 2 is a schematic of an embodiment demonstrating the working principle of an embodiment of a 3D lithium metal anode based on an embodiment of a mixed electron/ion conductive framework.

FIG. 2 is a schematic drawing showing an embodiment of the working principle of the 3D lithium metal anode based on a mixed electron/ion conductive framework.

Anode

The solid-state lithium metal anode possesses great promise owing to its high energy density and improved safety. This disclosure presents methods and structures for embodiments of a 3D solid Li metal anode, which is hosted in a solid-state ion-conducting framework and shows improved safety and/or reduced dendrite plating behavior. The 3D host can be based on a framework of a garnet-type Li-ion conductor and a coated Cu current collector. The Li anode can be deposited within the solid garnet framework from the Cu layer and can show dendrite-free solid-plating behavior, reducing the risk of dendrite penetration. In embodiments with a 3D ion-conductive host, instances of volume change problems and interface contact problems of the solid Li anode can be reduced, and can in some embodiments result in high-capacity solid Li anode cycling. This strategy enables Li metal anode for solid-state high-energy-density batteries with increased safety and/or durability.

The increasing demands for efficient and clean energy-storage systems have spurred the development of Li metal batteries, which can possess attractively high energy densities. However, it is desirable to resolve or reduce/mitigate intrinsic problems of Li metal anodes, such as the formation of Li dendrites, interfacial instability, and large volume changes during cycling.

Utilization of solid-state electrolytes for Li metal anodes can be advantageous in regards to issues of dendrite formation and safety. In the present disclosure, embodiments of 3D garnet-type ion-conductive frameworks are used as an embodiment of a host for the solid Li metal anode and demonstrates plating and stripping behaviors of the Li metal anode within the solid ion-conductive host. Shown herein, embodiments of 3D solid-state ion-conductive hosts and planar current collectors (shown at the bottom in various figures presented herein), Li is plated from the bottom (the current collector) and rises during deposition, and remains separated from the separator layer and the separator layer is protected from electrolyte penetration or short circuit. Owing to the solid-state deposition nature, Li can nucleate on the garnet skeleton and can grow smoothly in the pores of the garnet host and can grow without forming Li dendrites. The dendrite-free deposition and continuous rise/fall of the anode during plating/stripping in the 3D ion-conductive host can improve safety and durability of Li metal anodes. The solid-state Li anode can show stable cycling at 0.5 mA cm$^{-2}$ for 300 h with a small overpotential. Stable cycling can also be achieved at other current rates, such as 0.1-0.2 or 0.2-0.5 or 0.3-0.6 or 0.5-0.8 or 0.7-0.9 or 0.8-1.0 or 0.9-1.5 or 1.4-1.8 or 1.6-2.0 mA cm$^{-2}$.

Lithium (Li) metal batteries have been widely considered as promising candidates to next-generation energy storage owing to their extremely high theoretical energy densities (e.g., 2600 Wh kg-1 in Li—S battery and 3500 Wh kg-1 in Li-air battery). However, the utilization of Li metal anodes has long been hindered by the safety hazard because of the risk of Li dendrite growth and the potential for resulting short circuits. It is desirable to Li metal anodes for the application of high-energy-density Li batteries with improved safety and dendrite risk characteristics. Some approaches for improving Li metal anodes look for improvements from liquid electrolytes. Some embodiments of improvements on Li anodes include constraining Li metal in porous host materials, creating protective layers for the Li-electrolyte interface, and modifying the organic electrolytes. However, because of the intrinsic high reactivity of Li metal and the potential for dendrite formation by Li in liquid electrolytes, as well as the flammability and leakage potential of most organic electrolytes, continued and further improvement of the performance and safety of Li metal anodes is desired.

Solid-state batteries are expected to significantly improve the safety profile of Li metal anodes. Solid-state electrolytes, especially ceramic Li-ion conductors, show exceptional ability to inhibit the formation of Li dendrites and preclude the short-circuit hazard, and are non-flammability and non-leaking. However, solid-state electrolytes have relatively low ionic conductivity, which has been greatly improved recently, and the interface contact between the electrolyte and the electrode active material. For solid-state Li metal anodes, the lithiophobicity of the ceramic Li-ion conductors have resulted in poor interface contact and huge interface resistance. Several approaches to improving the Li-electrolyte interface is to add polymeric interlayers, coat lithiophilic layers, and control surface chemistry at the interface. However, due to the presence of grain boundaries in the solid-state electrolyte, there is a risk that Li could form dendrites and penetrate through the electrolyte, resulting in a short circuit. In addition, significant volume change can occur during Li plating and stripping and this volume change cam deteriorate the interface contact between the solid electrolyte and Li anode, increasing the impedance of the solid anode during cycling. The poor solid interface contact and volume change of Li anodes during cycling can in some cases limit the useful capacity of the associated battery.

Embodiments of solid Li metal anodes are described herein by hosting Li metal in a 3D Li-ion-conductive host with a current collector (shown at the bottom of the figures, and described from that orientation.) By cycling the Li anode within the 3D solid-state ion-conductive host, the plating/stripping behavior can be seen and an improved safety profile and dendrite characteristics are shown for the solid Li metal anode. As shown in FIG. 1, an embodiment shows the ion-conductive host consists of a dense layer as the separator and two porous layers for hosting active materials and Li metal. However, in additional embodiments, an anode assembly of a separator and a porous anode matrix can be combined with a cathode that comprises a liquid (such as a gel or a liquid electrolyte.)

A 3D ion-conductive framework was fabricated by using a garnet-type $Li_{6.75}La_{2.75}Zr_{1.75}Ca_{0.25}Nb_{0.25}O_{12}$ (LLZCN) Li-ion conductor (hereinafter, garnet) with a porous-dense-porous structure. Garnet-type Li-ion conductor is a promising solid-state electrolyte because of its favorable ionic conductivity, electrochemical stability, and chemical stability. A side view scanning electron microscope (SEM) image of the garnet host is shown in FIG. 1B. The upper layer is filled with the Li source (Li metal in this example embodiment, however other metals, such as Na or Mg can be paired with an appropriate ion-conductive framework) while the bottom layer is empty and coated with a thin layer of Cu as the current collector. As illustrated in FIG. 1c-e, this structure enables Li deposition only from the bottom (adjacent the current collector) where Li-ions from the garnet skeleton gain electrons from the Cu (or Li deposited on Cu). With more Li deposited, the front of the Li-filled layer rises from the bottom Cu substrate within the 3D framework. Subsequent stripping leads to the fall of the Li metal. As plating/stripping of Li results in the rise/fall of the anode in the host structure and away from the separator layer, reducing the risk of internal short-circuits caused by Li penetration.

Moreover, since Li metal in the ion-conductive host is reduced from solid-state Li ions, Li can be plated within the voids of the 3D framework without dendrite formation. This solid-state Li metal anode that rises and falls in the 3D ion-conductive provides new methods and structures for improved Li metal batteries.

Methods—1

Figure 3:
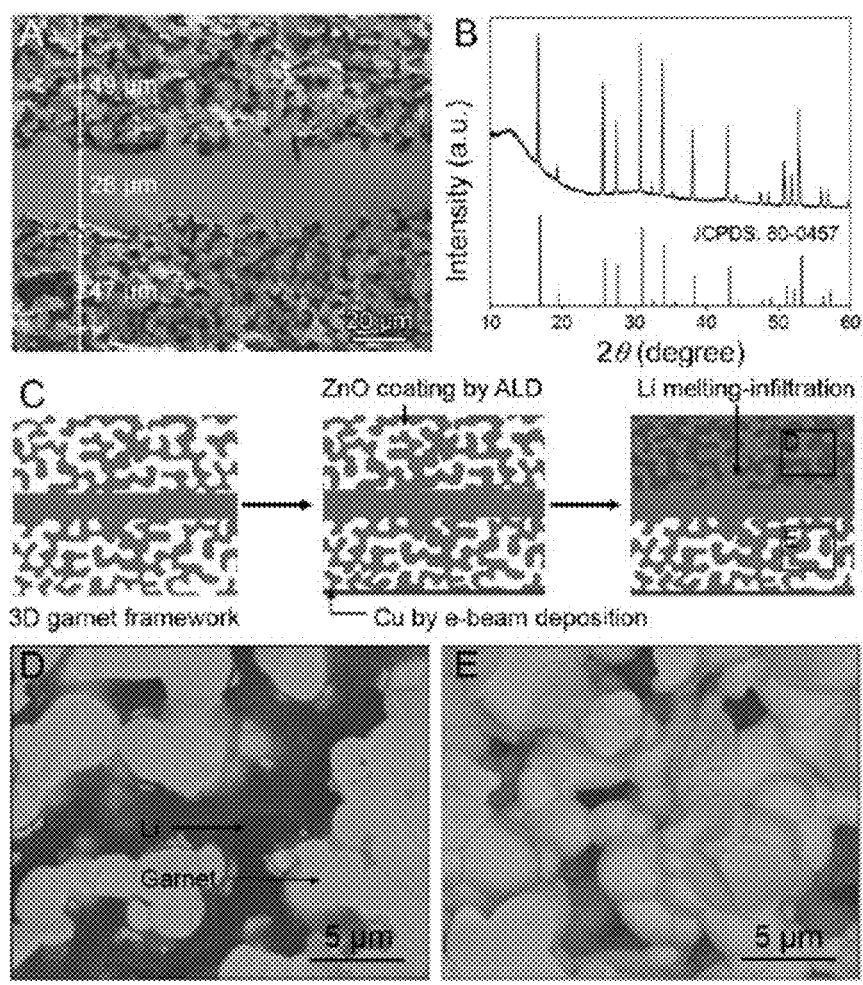
FIG. 3. Cell assembly for an embodiment of a solid-state Li metal anode in a 3D garnet host. (A) Cross-sectional SEM image of an embodiment of a 3D garnet host. (B) XRD pattern of an embodiment of a 3D porous LLZNO pellet in comparison with an embodiment of a standard cubic-phase $Li_5La_3Nb_2O_{12}$ (JCPDS 80-0457). (C) Schematic showing an embodiment of procedures to fill the upper layer of an embodiment of a porous garnet host with molten Li. (D) SEM images of the upper layer of an embodiment of a battery filled with Li metal by melt-infiltration, where Li is dark color and garnet is bright as indicated by the arrows. (E) The lower layer of an embodiment of a porous garnet without Li infiltration, which is reserved for electrochemical Li deposition.
Figure 7:
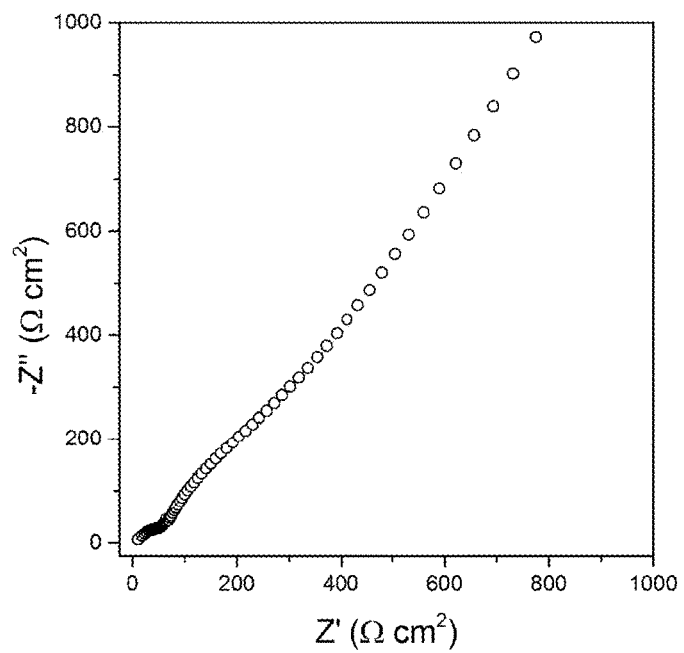
FIG. 7. Nyquist plot of an embodiment of a dense garnet pellet to calculate the ionic conductivity of garnet. The dense garnet pellet is 230 μm thick and 0.56 cm$^2$ in area. The impedance of the garnet pellet is 131Ω fitting the EIS data. Thus, the ionic conductivity of the garnet is $3\times10^{-4}$ S cm$^{-1}$.
Figure 8:
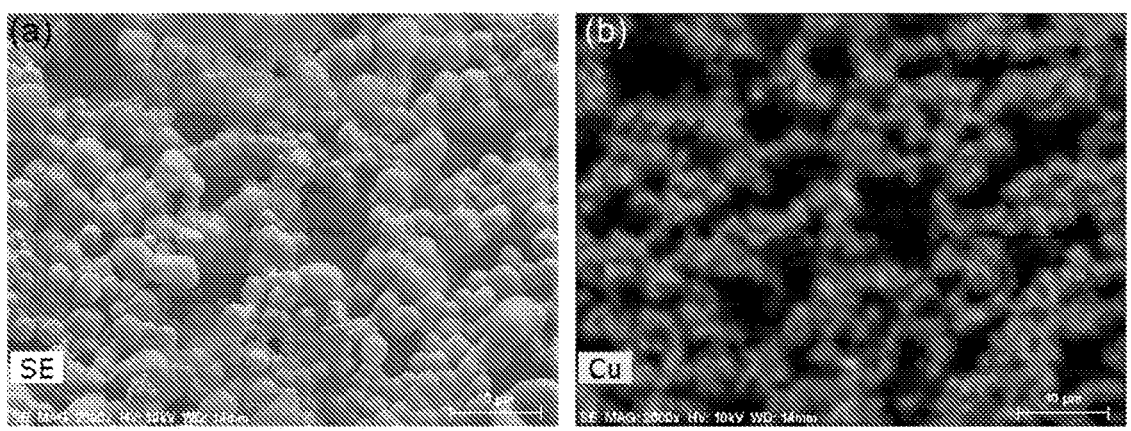
FIG. 8. (a) Plain-view SEM image and (b) corresponding elemental mapping of Cu on the bottom of an embodiment of a garnet framework coated with Cu by e-beam deposition method. The Cu shows conformal coating on the garnet framework.
Figure 9:
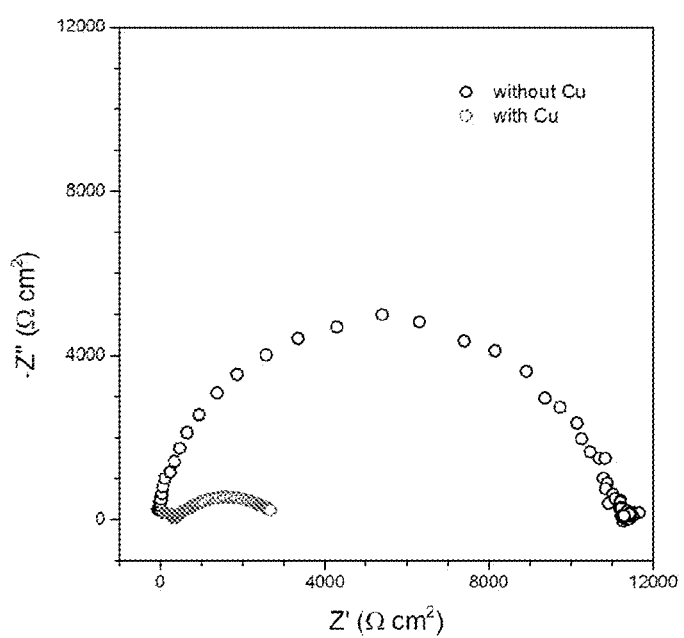
FIG. 9. EIS of Li-garnet cell with and without Cu coating at the bottom of an embodiment of a garnet framework. Cu coating layer on the garnet framework reduces the contact resistance at the garnet interface in the cell.
Figure 10:
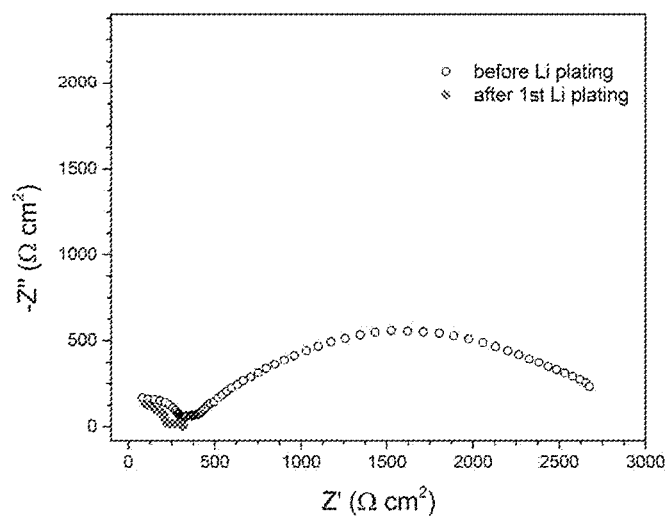
FIG. 10. EIS of Li-garnet cell before and after initial Li plating. The interface impedance was significantly reduced after first Li plating into the empty bottom layer of an embodiment of a garnet host.

A porous-dense-porous garnet pellet was synthesized by a tape-casting method. The cross-sectional view of the 3D garnet framework is shown in FIG. 3a. As with the framework shown in FIG. 1, the garnet framework of FIG. 3a has a dense separating layer and two porous layers. The separating layer in the embodiment shown in FIG. 3a is 28 μm thick and each porous layer is ~50 μm. In fact, by adjusting the garnet tapes, the thickness of the porous garnet layer can be adjusted (e.g. 20-150 μm or larger), and its porosity is ~50% (with other values for porosity such as between 20 and 70% for this or other suitable materials), thus providing appropriate room for hosting active materials of various capacities. As confirmed by the X-ray diffraction (XRD) profiles in FIG. 3b, the 3D garnet sample shows a well-crystalline structure, coincident with the cubic phase garnet $Li_5La_3Nb_2O_{12}$. As shown in the electrochemical impedance spectrum (EIS) in FIG. 7, the dense garnet of the sample has an ionic conductivity of $3 \times 10^{-4}$ S cm$^{-1}$ at room temperature To conduct electrons, a thin layer of Cu (~200 nm) was deposited at the bottom of the 3D garnet by e-beam evaporation. As shown in the SEM image of the bottom layer and corresponding elemental mapping of Cu by energy-dispersive X-ray spectroscopy (EDX) (FIG. 8), Cu is uniformly coated at the bottom of garnet grains. Due to the directional deposition by e-beam evaporation technique, Cu was not found inside the porous layer and served only as a current collector. The Cu current collector deposited on garnet framework significantly reduces the interfacial resistance in cell (see EIS in FIG. 20). The upper porous layer can be filled with cathode materials for assembly of full cells in practical uses. To show the Li plating/stripping behavior in the 3D ion-conductive host, the upper porous garnet layer was filled with Li metal as the Li source. Li was infiltrated into the upper porous layer by a melt-infiltration method, which is schematically presented in FIG. 3c. The upper layer of the porous garnet host was first coated with ZnO (50 nm thickness) by atomic layer deposition (ALD) to improve the wetting property of the garnet with molten Li. A thin Li foil was melted on top of the garnet pellet and infused into the pores of the upper layer by capillarity. The upper layer filled with Li can be clearly observed by SEM image of backscattered electrons (FIG. 3d), where the bright area indicates the garnet framework with heavy atoms (La, Zr, etc.) and the dark area indicates the infiltrated Li. Blocked by the dense separating layer, the molten Li did not diffuse through the separating layer and the bottom porous layer remained empty (FIG. 3e).

Figure 4:
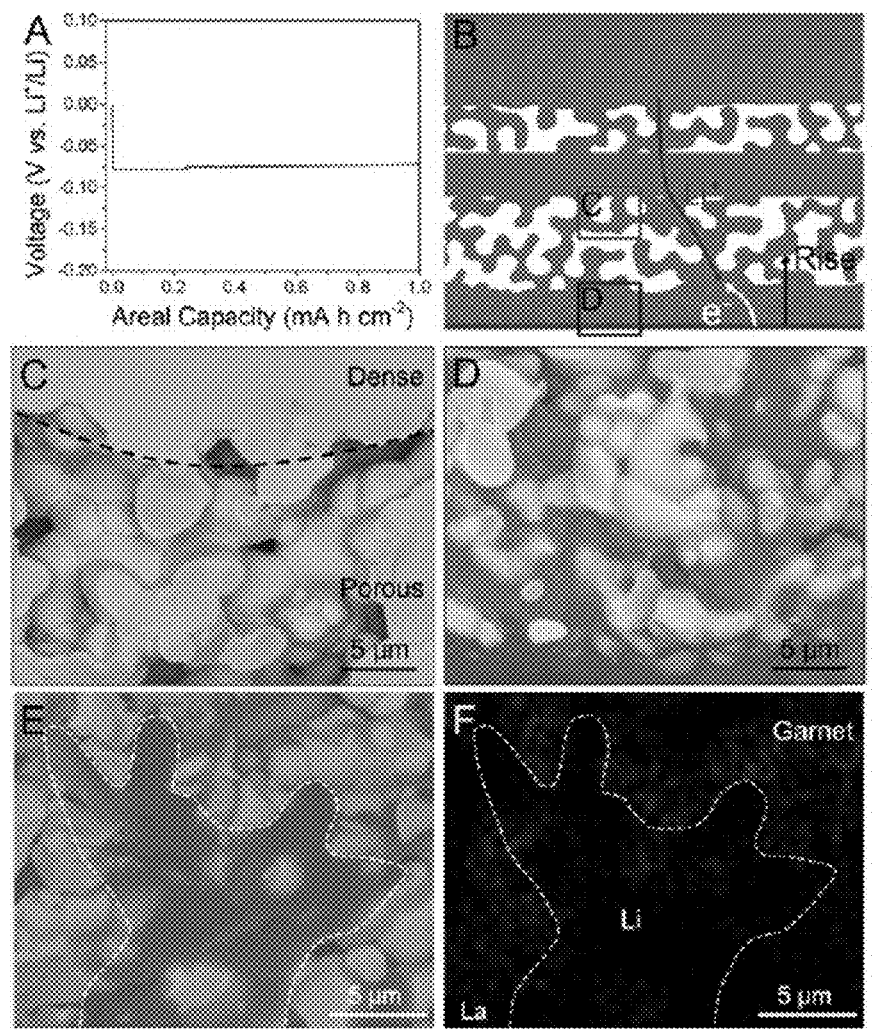
FIG. 4. Li deposition behavior in an embodiment of a 3D garnet host. (A) Voltage profile of an embodiment of Li plating within an embodiment of a porous garnet framework onto the bottom Cu layer at 0.5 mA cm$^{-2}$. (B) Schematic of Li growth in an embodiment of a 3D garnet framework with Cu current collector and transportation of Li-ions and electrons. Cross-sectional SEM images of an embodiment of a 3D garnet host after deposition Li metal in embodiments of two regions indicated in panel B: (C) near the dense separating layer, where the pores of the garnet host remain empty without Li deposition, (D) bottom region with Cu current collector, where the garnet host is deposited with Li metal. (E) Cross-sectional SEM image and (F) corresponding elemental distribution of La in Li deposited 3D garnet host.
Figure 21:
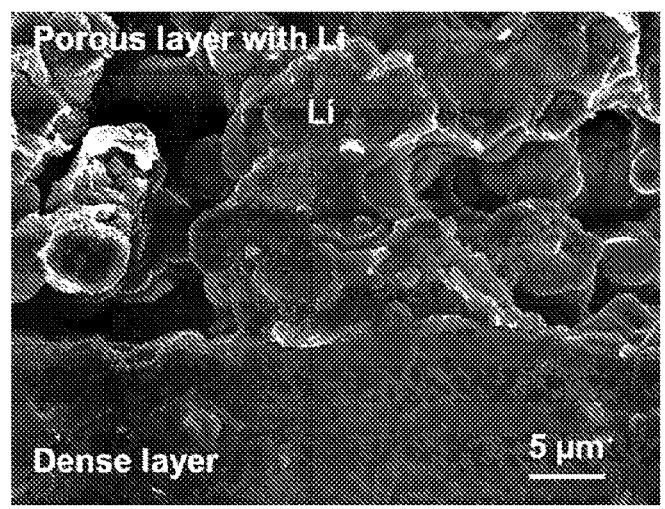
FIG. 21. The corresponding secondary electrons SEM image of FIG. 14f showing the Li metal distribution at the porous/dense interface after Li infiltration.

Using the empty porous garnet framework with the coated Cu substrate, the plating/stripping behavior of Li metal in the 3D garnet host was observed. The voltage profile of Li plating into the garnet host at 0.5 mA cm$^{-2}$ is shown in FIG. 4a. During Li deposition, the Li-ions migrate through the 3D garnet framework while the electrons transport from the Cu current collector (and already-deposited Li metal). Since all electrons come from the bottom of the garnet host, Li metal is always deposited from the bottom and rises with further Li deposition, as depicted in FIG. 4b. The deposition of Li on the bottom Cu leads to a significant reduction of the interface resistance of the cell (FIG. 21). FIGS. 4c and 3d show two regions of the cross section of the garnet host (as indicated in FIG. 4b) after Li deposition. After Li plating, the garnet host near the separating layer in FIG. 4c remains empty while the bottom part is electrochemically deposited with Li metal (dark regions in the pores of the garnet framework). Although the Li cannot be detected by EDX, the SEM image of the garnet framework after Li plating (FIG. 4e) and corresponding La elemental mapping in garnet (FIG. 4f) clearly indicate that the Li metal is filled in the voids of the garnet skeleton, covering the signal of La in the EDX mapping. The SEM images and EDX mapping confirm the deposition behavior of the Li metal anode illustrated in FIG. 4b, i.e., Li is plated initially on the bottom Cu layer away from the separating layer, averting possible dendrite penetration and short circuit.

Figure 5:
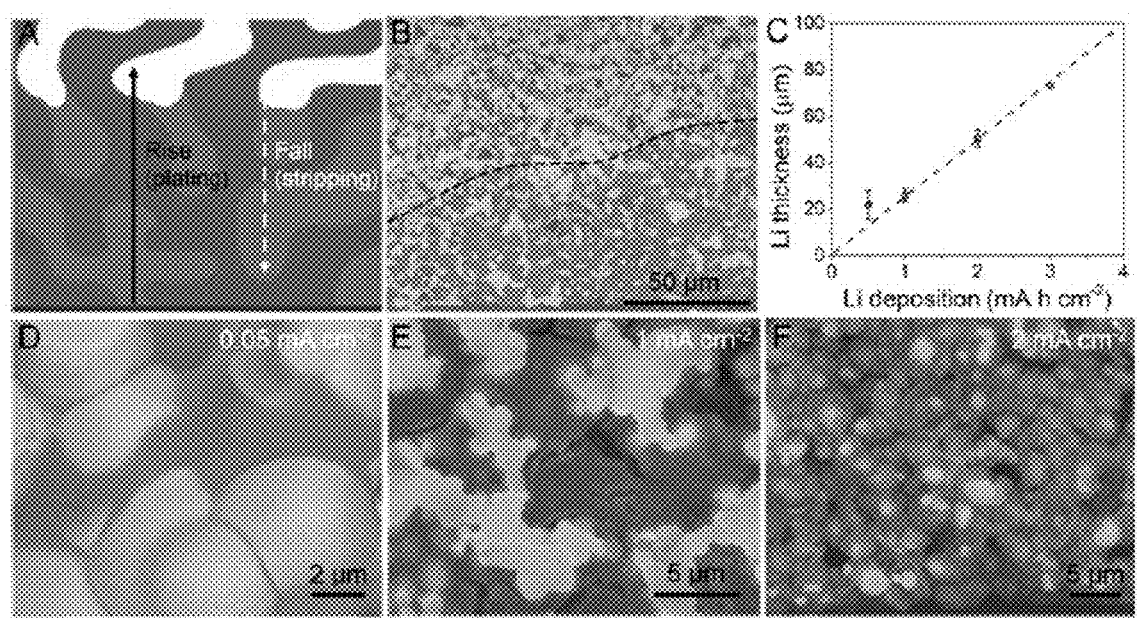
FIG. 5. Li plating/stripping behavior in garnet framework. (A) Schematic of Li rise/fall within an embodiment of a lower layer of garnet framework during plating/stripping. (B) SEM image of 2 mA h cm$^{-2}$ of Li deposited in an embodiment of a garnet framework. (C) Evolution of Li deposition thickness with the areal capacity of deposited Li. SEM images of Li deposited garnet framework at different current densities: (D) 0.05 mA cm$^{-2}$, (E) 1 mA cm$^{-2}$, and (F) 2 mA cm$^{-2}$.
Figure 11:
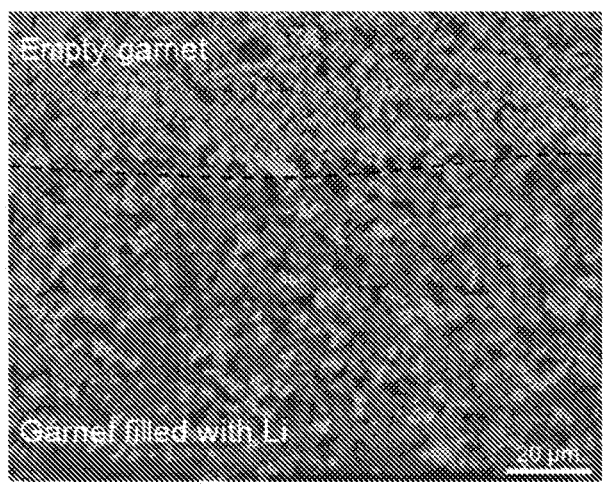
FIG. 11. Cross-sectional SEM image of 3 mA h cm$^{-2}$ of Li deposited in the lower layer of an embodiment of a garnet host. The thickness of deposited Li is 70 μm and the region near the separating layer remains empty without Li penetration.
Figure 12:
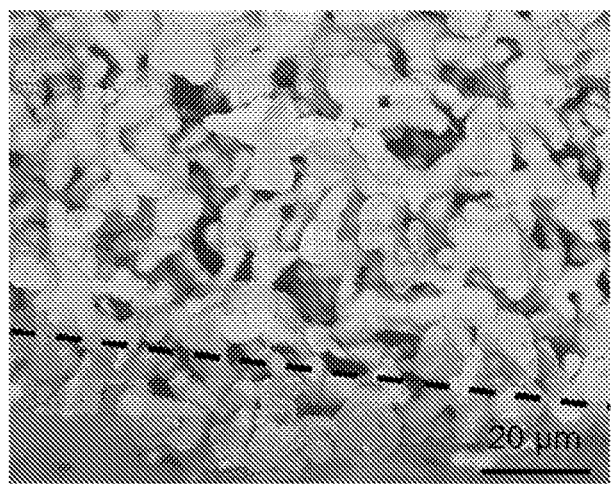
FIG. 12. Cross-sectional SEM image of an embodiment of a Li metal anode in an embodiment of a garnet host after stripping. Only residual Li remains on Cu current collector at the bottom of the garnet host after Li stripping.

The plating and stripping behavior of the Li metal anode in the 3D garnet host was further studied by plating Li with different areal capacities. As demonstrated above, plating of Li within the solid-state garnet framework starts from the electron-conductive Cu layer. During further Li deposition, Li metal grows epitaxially on the previous Li, where Li-ions from the garnet framework gain electrons from the already-deposited Li metal and Cu substrate. This deposition behavior leads to the rise of Li in the host during Li deposition as depicted in FIG. 5a. The SEM image (FIG. 5b) of Li metal deposited in the garnet host for 2 mA h cm$^2$ displays a consistent result. Li is plated in the lower layer of the garnet host and shows a rising growth profile. The Li filled in the garnet host is ~50 μm, mainly grown on the bottom Cu substrate, while leaving the separator-adjacent garnet host empty. Li metal of 3 mA h cm$^{-2}$ also shows a consistent result with a Li deposition thickness of ~70 μm (FIG. 11). The thickness of Li deposited within the garnet host with different capacity of Li is summarized FIG. 5c. The thickness of the hosted Li metal anode shows an approximately linear relationship to the areal capacity, which indicates that Li roughly evenly rises from the bottom current collector during plating. After stripping the Li in the garnet host, it is found that only residual Li remains on the bottom of the host (FIG. 12) and Li height "falls" to nearly 0. This unique plating/stripping behavior can in various embodiments improve the safety of Li metal anodes because Li metal is initially deposited on the bottom current collector, away from the separating layer, and fills the preserved pores in the ionic conductive host, avoiding interface contact problem in planar solid electrolytes.

Another prominent advantage of the proposed 3D Li metal anode enabled by the solid-state ion-conductive host is that the potential for growth of Li dendrites can be reduced. As shown in FIG. 5d, Li metal deposited in the porous garnet at 0.05 mA cm$^{-2}$ shows an extremely dense and smooth morphology, without any dendritic Li, which is a major issue in liquid electrolyte Li metal anodes. Without wishing to be bound by theory, it is believed that the smooth and dense deposition of Li metal results from a balance of Li-ions transferred from the garnet framework and the electrons from the bottom Cu layer. At increased current densities, the morphology of deposited Li changes, but dendritic Li is eliminated. As shown by the SEM images, Li anodes deposited at 0.5 mA cm$^{-2}$ (FIG. 4d), 1 mA cm$^{-2}$ (FIG. 5e), and 2 mA cm$^{-2}$ (FIG. 5f) do not form any dendrites, though Li deposited at higher current densities is not as dense as that deposited at 0.05 mA cm$^{-2}$. The dendrite-free Li anode in the garnet host should be attributed to the solid-state Li deposition. This solid-state Li anode in 3D ion-conducting host is significantly different from that in liquid electrolytes, where Li-ions are ubiquitous and Li dendrites are inevitable. In embodiments shown herein, using the garnet host, the Li-ions transport only through the ionic conductive framework and Li metal grows only at the interface of ion-conductor and electron-conductor, without forming dendritic morphology.

The cyclability of the solid-state Li metal anode in 3D ion-conductive host was further demonstrated by cycling the Li metal anode in the garnet framework at 0.5 mA cm$^{-2}$. As shown in the cycling voltage profiles and zoomed-in profiles in FIGS. 6A-C, the solid-state Li metal anode was cycled for 300 h at 0.5 mA cm$^{-2}$ for an areal capacity of 1 mA h cm$^{-2}$ each half cycle (1.5 mA h cm$^{-2}$ for the initial plating). The voltage overpotential is gradually reduced from ~80 mV to ~20 mV during the first several cycles, indicating an improved interface contact of electron-conductor (Li metal) and ion-conductor (garnet framework). The Li anode in the garnet host shows a stable plating/stripping voltage of ~20 mV (FIGS. 6b and 6c) after the first several cycles and cycles for 300 h. The stabilized overpotential of the solid-state Li metal anode is almost as small as that of the Li metal anode using liquid electrolytes, which should be attributed to the high ionic conductivity of the garnet-type ion-conductor and the thin separating layer. The stable cycling performance results from the advantageous plating/stripping behavior of Li metal within the garnet host. By the bottom-up plating strategy, the solid-state Li metal anode is free from dendritic Li and solid-state interface problems. Different current densities, from 0.05 to 2 mA cm$^{-2}$, were applied to plate Li into the garnet host on the Cu layer, of which discharge voltage profiles are shown in FIG. 5d. The solid-state Li metal anode can be plated for 1 mA h cm$^{-2}$ at even 2 mA cm$^{-2}$, which has hardly been achieved in ceramic solid-state batteries.

Figure 6:
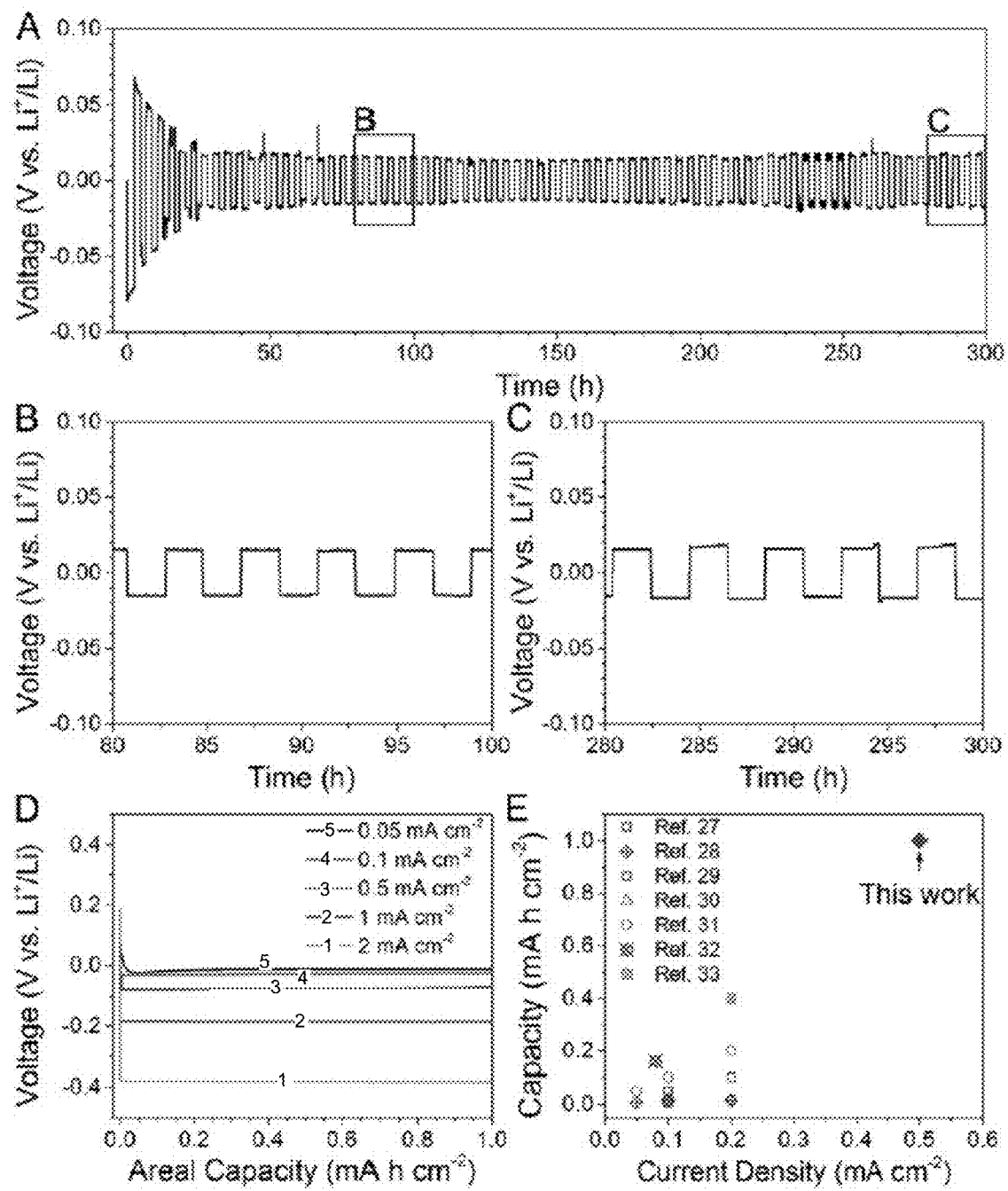
FIG. 6. Electrochemical study of Li plating/stripping within garnet host. (A) Discharge/charge voltage profiles of the Li cycling in garnet host at 0.5 mA cm$^{-2}$ and local view of voltage profiles at (B) 80-100 h and (C) 280-300 h. (D) Voltage profiles of Li plating at different current densities in garnet host. (E) Comparison of the cycleable areal capacity and current density of embodiments of solid-state Li metal anodes in this work and previous publications.

In FIG. 6e, the cycling capacity and current density of solid-state Li metal anodes of ceramic electrolytes described herein are compared with values from literature. The Li anode in 3D (porous) garnet host shows a much higher capacity at a reasonable current density than previous studies using planar ceramic electrolytes. Hindered by the volume changes at the anode-electrolyte interface during cycling, the previous solid-state Li anodes with ceramic electrolytes were generally limited to low capacities and small current densities. By depositing Li metal anode in the garnet host, the Li anode avoids several solid-solid interface problems and can thus be safely cycled with increased capacities at higher current densities. We note that the rate capability of the Li anode with the ceramic solid-state electrolyte is still lower than that of at least some anodes with liquid electrolytes. The solid-state Li anode generally shows a larger voltage polarization, especially during the initial cycles (80 mV at 0.5 mA cm$^{-2}$), than the Li anodes in liquid electrolytes (approximately ~25 mV at 0.5 mA cm$^{-2}$).

However, an advantage of the solid-state Li anode described herein lies in the potentially intrinsically safe deposition behavior, which improves not only the battery safety but also the cell cyclability.

In summary, disclosed are embodiments of a Li metal anode in a solid-state 3D ion-conductive host with improved safety and dendrite-forming characteristics. By depositing Li metal into the 3D garnet framework with beginning at the current collector away from the separating layer, with the lithium metal progressively filling the garnet host toward the separator, improved dendrite formation characteristics are achieved. Since the Li is initially plated at the current collector and away from the separator, the possibility of penetration through the electrolyte is reduced. The solid-state depositing property of Li ions reduces the dendritic morphology of Li metal anodes as compared to cells with liquid electrolytes. The rise/fall behavior within the pre-served pores of the garnet host observed during Li plating/stripping can also reduce the volume change of the Li anode during cycling and can improve or preserve the electrolyte-anode interface contact. The solid Li metal anode in the garnet host can also exhibit good cycling stability. An embodiment can be cycled at 0.5 mA cm$^{-2}$ for 300 h without dendrite-induced short circuit or large interface resistance. Benefiting from the 3D ion-conductive host, the solid Li anode can be cycled for 1 mA h cm$^{-2}$, which is much higher than most previous solid-state Li anodes based on planar ceramic electrolytes and is comparable to Li anodes in liquid electrolyte batteries. Embodiments of dendrite-free and safe depositing properties of the solid Li anode in ion-conductive host systems and methods disclosed herein can be used to build high-energy metal batteries with improved durability and reliability.

Methods—2

Garnet Solid Electrolyte Fabrication

The $Li_{6.75}La_{2.75}Ca_{0.25}Zr_{1.75}Nb_{0.25}O_{12}$ (LLCZN) powder was synthesized by conventional solid-state reaction. The starting materials were LiOH (99%, Alfa Aesar), $La_2O_3$ (99.9%, Alfa Aesar), $CaCO_3$ (99.9%, Sigma Aldrich), $ZrO_2$ (99.9%, Alfa Aesar) and $Nb_2O_5$ (99.99%, Alfa Aesar). Stoichiometric amounts of the raw materials and 10% excess LiOH were mixed by ball-milling and calcined at 900° C. for 12 h.

Tape casting was used to fabricate the trilayer framework. LLCZN was mixed with fish oil, polyvinyl butyral and butyl benzyl phthalate in toluene and isopropanol to prepare the slurry, which was casted by doctor blade on Mylar sheet Poly(methyl methacrylate) spheres were added as porogens in porous tape. The pore size of the porous layer can be controlled by the size of polymer based pore formers and its content. Dense and porous layers were fabricated separately and then laminated into a trilayer tape. The thickness of each individual layer was well controlled. The tapes were laminated and hot-pressed to form a trilayer structure. Then it was sintered at 1050° C. for 1 h to obtain the porous-dense-porous garnet framework Cell Assembly The Cu layer deposited at the bottom of the garnet host was sputtered by an electron-beam physical vapor deposition on an Angstrom NexDep Ebeam Evaporator. The upper layer of the garnet host was coated with ZnO by ALD to increase its wettability with molten Li. The ALD deposition of ZnO was performed on Beneq TFS 500 at 150° C. for 150 cycles. Each cycle alternates reactions of diethyl zinc or water with the 3D garnet pellet Li was then infiltrated into the host from top of the garnet pellet (without Cu deposition and with ZnO coating) by melt-infiltration in an argon-filled glovebox. A fresh piece of Li foil was placed on the garnet host and was covered by stainless steel, which provided suitable pressure for Li infiltration into the garnet pores. The Li on the garnet pellet was heated at 250° C. in an oven in the glovebox for 30 min, during which Li impregnated into the upper porous layer of the garnet host. The as-obtained porous garnet pellet with one side filled with Li and the other empty side deposited with Cu was used as a solid-state cell for electrochemical study.

Characterizations and Electrochemical Tests

To determine the crystal structure of the 3D garnet host, XRD was performed on a C2 Discover diffractometer (Bruker AXS) with a Cu Kα radiation source (λ=1.54056 A) at 40 kV and 40 mA. Morphology and elemental distribution of the garnet host with or without Li were observed on a Hitachi SU-70 SEM coupled with an energy-dispersive X-ray spectroscopy system by collecting secondary electrons and backscattered electrons.

Electrochemical tests were conducted on BioLogic VMP3 electrochemical systems connected to the assembled solid-state cells in the glovebox. The side of garnet host filled with Li was used as a counter/reference electrode while the other empty side deposited with Cu was used as a working electrode to study the behavior of Li metal plating/stripping. EIS was measured in the frequency range of 1 MHz to 0.1 Hz. Galvanostatic Li plating was performed at 0.05-2 mA cm$^2$ for a capacity of 1 mA cm$^{-2}$. Plating/stripping of Li metal with the garnet host was performed at 0.5 mA cm$^{-2}$ for 1 mA h cm$^{-2}$.

Bi-Layers, Cathodes and Interlayers

The following discussion carries an emphasis related to bi-layer structures. However the teachings are also applicable by a person of skill in the art to other embodiments described herein, including but not limited to tri-layers and other types of batteries. In addition, the teachings presented elsewhere in this disclosure is also applicable to the disclosure in this section.

The presently disclosed subject matter relates generally to a solid-state electrolyte framework and its methods of use and manufacture. This framework addresses the main challenge of solid-state batteries associated with the contact between solid state electrolyte and Li metal anode. In certain embodiments, this framework may be employed to produce solid-state batteries with high energy densities and long-term stability, which will facilitate the development of solid-state lithium batteries.

Solid-state electrolytes are non-flammable, electrochemically stable over large potential windows, highly ionic conductive ($10^{-4}$-$10^{-3}$ S/cm), and able to block Li dendrites. However, the interfacial resistance between solid-state electrolytes and electrodes is not stable during battery cycling. Additionally, the high thickness and mass of solid-state electrolytes limits their application for batteries with high energy densities.

The presently disclosed subject matter relates generally to a solid-state electrolyte framework. In certain embodiments, the framework includes two layers. In an example embodiment disclosed herein, the two layers include one dense layer and one porous layer integrated together. As is described in the present example embodiment, the framework may be used in battery systems. In such embodiments, the framework may function simultaneously as a separator and a 3D host for electrode materials. Certain embodiments of the bi-layer framework can be fabricated by tape casting and sintering methods. Solid-state batteries may be manufactured by infiltrating melted anode in the porous side of the solid state electrolyte, and laminating cathode on the dense side afterwards, however the filling of the active material into the battery can also take place by other methods, including those described herein. With these techniques, solid-state batteries with high stability and high energy densities can be fabricated.

The presently described framework is functionally compatible with a variety of anode types including, but not limited to, lithium metal anodes and lithium compound anodes. Similarly, the present framework is compatible with a variety of cathodes. Examples of compatible cathodes include but are not limited to, lithium compound cathodes (e.g. $LiCoO_2$, $LiMnO_2$, $LiNiO_2$, $LiNi_xMn_yCo_zO_2$(NMC), $LiNi_xCo_yAl_zO_2$(NCA), $LiFePO_4$, $LiCoPO_4$, $LiMnPO_4$, $LiFeSO_4F$, $V_xO_y/LiV_xO_y$, $LiVPO_4F$, $LiFeMnO_4$), sulfur-based cathodes (e.g. S, $Li_xS$), metal chalcogenide cathodes (e.g. $TiS_3$, $NbSe_3$, $LiTiS_2$), fluorine and chlorine compound cathodes (e.g. LiF cathode), lithium-oxygen and lithium-air cathodes, and cathodes containing combinations of these materials.

Example embodiments of the framework enabling lithium batteries:
  Solid-state lithium metal batteries, with lithium ion cathodes (e.g. $LiFePO_4$, NMC, $LiCoO_2$, $LiFeMnO_4$, $V_2O_5$) and Li metal/Li compound anodes (e.g. Li, Li/Al compound),
  Solid-state lithium sulfur batteries, with sulfur cathodes (e.g. S, $Li_xS$) and Li metal/Li compound anodes,
  Solid-state lithium air batteries, with Li-Air cathodes and Li metal/Li compound anodes.

Figure 13:
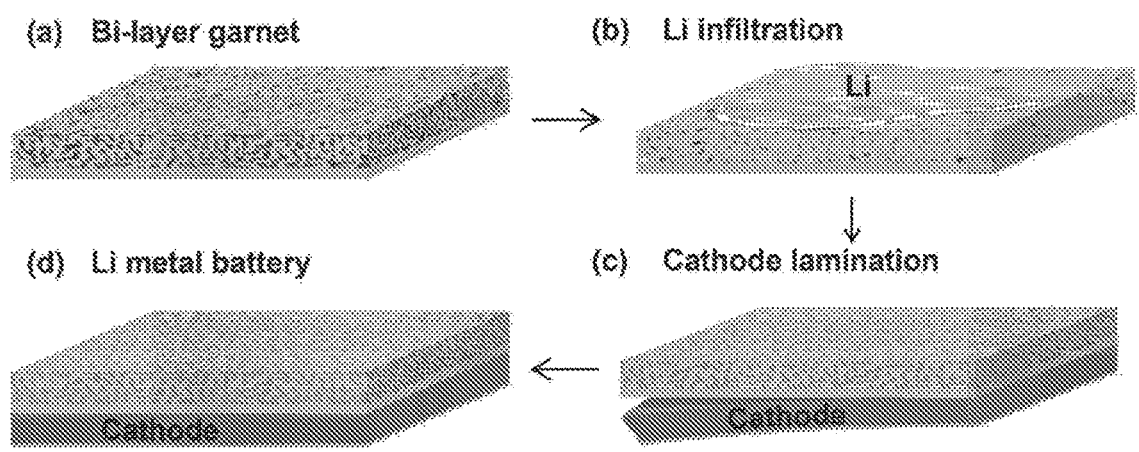
FIG. 13. Schematic diagram of an embodiment of a fabrication process of the Li battery with a bi-layer solid-state framework. (a) Two layers of precursor tapes were sintered together into the framework. (b) After sintering, Li metal is infiltrated into the porous garnet framework to form a solid-state Li metal anode. Batteries can be manufactured based on the bi-layer framework with Li in the porous layer functioning as both anode and separator. (c-d) Pre-made cathodes of different types wetted by electrolyte comprising a liquid, where the electrolyte can be in the form of a gel or a liquid, can be laminated directly on top of the dense side of the bi-layer framework to develop a solid-state battery.

FIG. 13 is a Schematic diagram of an embodiment of a fabrication process of the Li battery with a bi-layer solid-state framework. Two layers of precursor tapes were sintered together into the framework. After sintering, Li metal is infiltrated into the porous garnet framework to form a solid-state Li metal anode. Batteries can be manufactured based on the bi-layer framework with Li in the porous layer functioning as both anode and separator. Pre-made cathodes of different types wetted by electrolyte comprising a liquid, where the electrolyte can be in the form of a gel or a liquid, can be laminated directly on top of the dense side of the bi-layer framework to develop a solid-state battery. The cathode can have a current collector, such as an electrical conducting material (e.g. compatible metal, semiconductor or carbon material, including those discussed herein) affixed to the cathode at the time the cathode is assembled to the bi-layer or can be affixed after the cathode is assembled to the bi-layer.

Benefits offered by the present invention
  The present framework can enable various types of electrodes to be applied in solid-state battery architectures.
  The present framework can enable solid-state batteries with high energy density and stability.
  The present framework can facilitate the development of solid-state Li metal batteries, Li ion batteries, Li-sulfur batteries, and Li-air batteries, among other chemistries, which have much higher energy density and are much safer than conventional batteries.
  The wide electrochemical stability window (0~5 V vs. $Li^+/Li$) of the solid-state electrolyte framework will enable the application of high voltage cathode materials.

The following describes example embodiments and uses of the presently described solid-state ionic framework, including aspects related to use and construction of bi-layers and batteries that utilize bi-layers. Specific example chemistries are described herein to demonstrate performance characteristics in example battery applications. The presently described framework may be used in other applications and should not be limited to the example embodiments presented hereafter.

Solid-state electrolytes (SSEs) have been widely studied to enable application of high-energy Li metal anodes in batteries with high safety and stable performance. However, integration of SSEs into batteries is hindered by the infinite volume change of Li metal anodes, unstable resistance between Li and SSE, and low battery energy densities. To address these challenges, a porous-dense bilayer structured $Li_{6.75}La_{2.75}Zr_{1.75}Ca_{0.25}Nb_{0.25}O_{12}$ garnet SSE as a 3D ionic framework for Li metal. The framework includes one porous layer as a volume-stable host of Li metal with large contact area, and one dense layer as a solid-state separator preventing short-circuits. The flatness of the dense layer enables simple battery manufacturing by laying a pre-made cathode on top of the bilayer framework. The thicknesses of the porous and dense layers are well controlled at 50 and 20 μm, respectively, in order to improve the battery energy density. Based on the bilayer garnet framework and high mass-loading $Li(Ni_{0.5}Mn_{0.3}Co_{0.2})O_2$ (NMC) cathodes (32 mg/cm²), we developed solid-state Li-NMC batteries with energy densities (330 Wh/kg and 972 Wh/L) significantly higher than all of the state-of-art garnet-based Li metal batteries. The bilayer framework design provides a promising strategy towards solid-state Li metal batteries with high energy densities because of its well-designed thickness, stable cycling performance, and feasibility to be integrated with high-energy cathodes.

Introduction
Lithium metal is ultimate desirable choice for battery anodes, because it has the highest specific capacity (3860 mAh/g) and the lowest electrochemical potential (−3.04 V vs. standard hydrogen electrode) among all anode materials. However, there are challenges regarding the safety and stability of Li metal anodes in conventional batteries with liquid electrolytes, including dendrite formation, unstable solid electrolyte interface (SEI), and infinite anode volume change upon cycling. Strategies have been developed for Li metal anode protection, such as electrolyte additives, artificial SEI, and nano-structural engineering on the surface of Li metal. These strategies can improve the stability of electrolytes against Li and suppress unstable SEI formation, but cannot completely prevent Li metal dendrite penetration. Inorganic solid-state electrolytes (SSEs) have been developed to intrinsically solve the safety issues of Li metal batteries by mechanically blocking Li metal dendrites due to their high shear moduli. Besides, SSEs have other superior safety performances to liquid electrolytes, such as wide electrochemical windows and high thermal stabilities. Various types of SSEs have been developed during the past few years, including oxynitrides, sulfides, and oxides. Among all viable SSEs, garnet-type $Li_{6.75}La_{2.75}Zr_{1.75}Ca_{0.25}Nb_{0.25}O_{12}$ is promising for Li metal batteries due to its wide electrochemical window (0~6 V vs. $Li^+/Li$), high ionic conductivity ($\sim 10^{-3}$ S/cm), and high chemical and electrochemical stabilities against Li metal. However, one of the remaining obstacles to integrating garnet SSEs into Li metal batteries is the unstable interfacial resistance between Li and garnet while cycling. This instability can be attributed to the significant volume change at the Li metal electrode during platting and stripping. Another challenge is the large thickness and mass of garnet electrolytes fabricated by traditional powder-sintering processes. It is difficult to reduce the thickness of garnet electrolyte below 100 μm for full cell applications and processing, which both adds significant Ohmic resistance and hinders the resultant volumetric energy density. Thick garnet with a density of 4.97 g/cm$^3$ occupies a high mass ratio in the full cell and results in a low gravimetric energy density.

Researchers have developed 3D frameworks for Li metal anodes from carbon, metals, and polymers for batteries with liquid electrolytes, which can prevent the significant volume change for Li metal anodes. However, since liquid electrolytes are still employed, it is difficult to extend theses host designs into solid-state Li batteries, and the dendrite formation and unstable SEI issues of Li metal anode remain unsolved. In this work, we developed a garnet-based 3D framework with a porous-dense bilayer structure as a solid-state Li metal host to address the unstable anode volume and limited energy density issues of solid-state Li metal batteries. Such a bilayer structural design is promising for safe and high-energy-density Li metal batteries, as it provides not only highly conductive and continuous ionic pathways for Li ion transport, but also a mechanically and electrochemically stable and porous framework for Li metal anode. The integration of the Li metal host (porous layer) and the solid-state electrolyte/separator (dense layer) into a single slice with a high flatness on the dense side also enables easy assembly of a highly loaded Li(Ni$_{0.5}$Mn$_{0.3}$Co$_{0.2}$)O$_2$ (NMC) cathode. The solid-state Li/bilayer-garnet/NMC batteries demonstrate stable electrochemical performance because of the firm volume of the framework and the constant resistance between Li metal and garnet. High battery energy densities can be achieved due to the structure of the bilayer framework with a significant reduction in solid-state separator thickness (20 μm vs. 100 μm or more) and the application of highly loaded cathodes. The bilayer garnet framework provides a promising strategy for solid-state Li metal anodes, which can be easily integrated with various types of cathode chemistries for batteries with high energy densities.

Results and Discussions of an Example Embodiment

The framework includes one dense layer and one porous layer which can be combined by co-sintering (FIG. 14a) or other means. In FIG. 14a, The two layers were fabricated by tape-casting, and then sintered together into a bilayer structure. The porosity of the porous layer is 70%, which is realized by controlling the volume ratio of sacrificial polymer pore-formers in the tape. We developed a 3D Li metal anode based on the bilayer framework by infiltrating molten Li into the porous garnet at 250° C. Zinc oxide is pre-coated through the porous layer by atomic layer deposition, for better contact between the molten Li metal and garnet. Other materials that allow Li (or the selected active metal) to wet the surface of the porous layer can also be used, but for convenience will be referred to as zinc oxide. Li metal is distributed through the whole layer with continuous contact to the framework after infiltration, because of the highly porous structures (FIG. 14b). The infiltration time is designed for five minutes so that large empty spaces remain in the framework for full cell integration with lithiated NMC cathodes.

Based on the integrated Li metal anode, a battery can be assembled by laying a pre-made cathode film on the dense side of the bilayer framework (FIG. 14c). The ionic conductivity between garnet and the cathode is achieved by a gel interlayer suitable for the chemical, environmental and electrical environment of the battery and the desired conductivity characteristics. This direct assembly strategy enables easy integration between the solid-state Li metal anode and conventional battery cathodes. FIG. 14d displays the structure of the solid-state battery with the Li metal anode hosted by the garnet framework. In the full cell, high mass loading cathodes can be integrated with the bilayer garnet framework because of the porous layer with high areal specific capacity and the gel interlayer with a Li$^+$-conductive interface. The highly loaded cathode and the garnet framework with an designed structure provides high gravimetric and volumetric energy densities for solid-state batteries. Different types of cathodes can be applied together with the bilayer framework, which gives a wide practicability of solid-state electrolytes in high-energy Li metal batteries.

Figure 14:
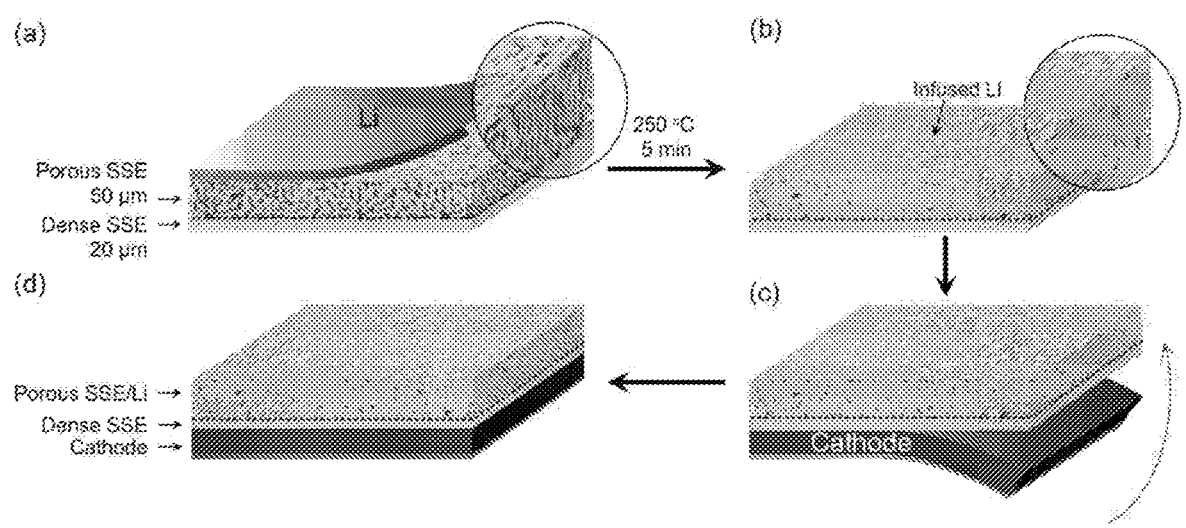
FIG. 14. Process of developing a solid-state Li metal battery based on the bilayer garnet framework. (a) Diagram of an embodiment of a bilayer garnet framework composed of a dense layer and a porous layer. The two layers are integrated together by co-sintering the precursor tapes. Li metal foil is coated on the porous side for infiltration. (b) 3D Li anode based on the framework, developed by infusing molten Li metal into the porous layer. The porous layer can function as the host for Li metal, and the dense layer can work as the solid-state separator between the two electrodes. (c) Batteries can be integrated by laying a pre-made cathode on the dense side of the bilayer garnet framework. (d) The accomplished Li metal battery based on the bilayer garnet framework. The battery is composed of the 3D Li metal anode, garnet solid-state electrolyte, and a cathode pre-made by conventional techniques.

FIG. 14. Process of developing a solid-state Li metal battery based on the bilayer garnet framework. (a) Diagram of an embodiment of a bilayer garnet framework composed of a dense layer and a porous layer. The two layers are integrated together by co-sintering the precursor tapes. Li metal foil is coated on the porous side for infiltration. (b) 3D Li anode based on the framework, developed by infusing molten Li metal into the porous layer. The porous layer can function as the host for Li metal, and the dense layer can work as the solid-state separator between the two electrodes. (c) Batteries can be integrated by laying a pre-made cathode on the dense side of the bilayer garnet framework. (d) The accomplished Li metal battery based on the bilayer garnet framework. The battery is composed of the 3D Li metal anode, garnet solid-state electrolyte, and a cathode pre-made by conventional techniques.

Figure 15:
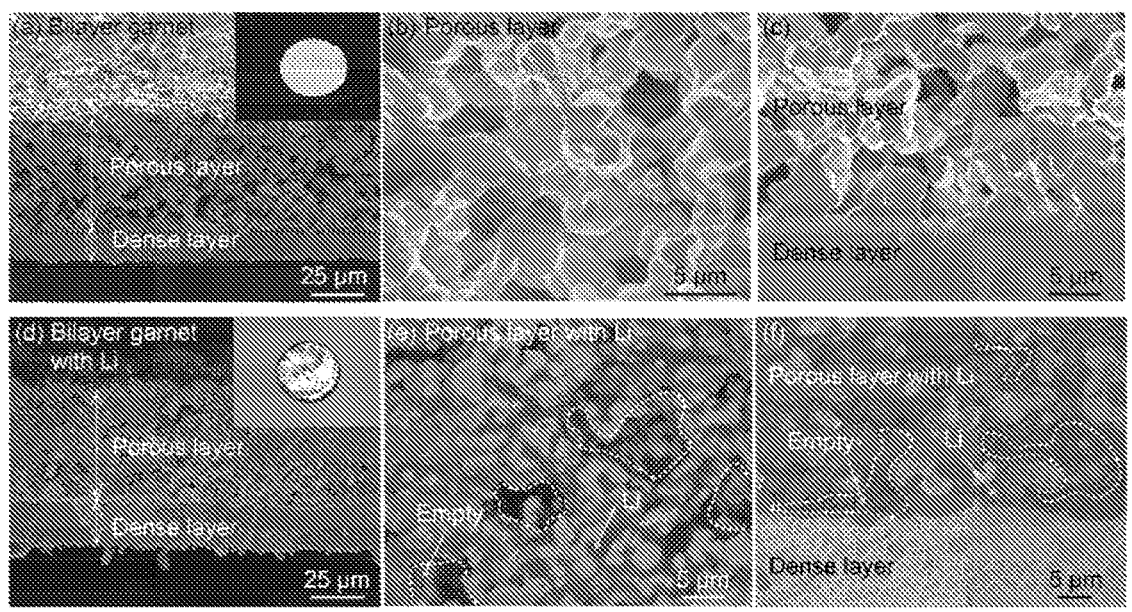
FIG. 15. Morphologies of the bilayer garnet framework before and after Li metal infiltration. (a) Cross-sectional SEM image of the bilayer garnet with one dense and porous layer. The thicknesses of both layers are precisely controlled to achieve desired mechanical strength of the framework as well as the energy density of the integrated battery. Inset is a photo of the bilayer garnet disk. (b) Magnified SEM image of the porous layer of the framework. (c) Magnified SEM image of the interface between the dense and porous layers, indicating continuous integration of the two layers. (d) Cross-sectional SEM image of a bilayer garnet with Li metal infiltrated inside. The porous layer is infiltrated with Li metal but the dense layer is pristine. Inset is an image of the bilayer garnet disk after Li metal infiltration. (e) Back-scattering SEM image of the porous layer infused with Li metal and retaining some void space. (f) Back-scattering SEM image of the interface between the dense and porous layers with Li metal.

FIG. 15 shows the morphologies of a bilayer garnet framework by scanning electron microscopy (SEM) before and after Li metal infiltration. The thicknesses of the dense and porous layers are controlled to 20 μm and 50 μm, respectively (FIG. 15a). The dense layer without open pores effectively prevents short-circuiting and provides high chemical stability for the hosted Li metal. The dense side of the bilayer framework has a flat top surface with no defects, providing a continuous interface for the cathode (See also FIG. 19a and related discussion). The porous layer with a continuous 3D structure hosts Li metal and transports Li$^+$ ions between the anode and the cathode. There are open holes uniformly distributed on top of the porous layer (See also FIG. 19b and related discussion), enabling Li metal infiltration into the framework. FIG. 15b exhibits the morphology of the porous garnet layer. The garnet grains are firmly sintered together to form continuous ionic pathways for high ionic conductivity. The large empty space in the porous layer provides a high capability of Li metal in the framework. Cross-sections of the interface between the dense and porous layers of garnet (FIG. 15c) indicate good contact between the two layers with help of optimized selected co-sintering temperature and time. The continuous contact between the two layers ensures a low and stable resistance between the Li metal anode and cathode. The bilayer framework has a pure cubic garnet phase as confirmed by X-ray diffraction plotted in FIG. 20. The large empty space in the porous layer is infiltrated and filled with Li metal due to the improved wettability of the garnet by zinc oxide, as seen in FIG. 14D. The inset of FIG. 15d is a top-view image of the bilayer garnet after Li metal infiltration to help confirm the uniformity and stability of the Li metal anode after the infiltration process. The cross-sectional SEM image of the porous garnet layer with Li metal reveals a continuous layer of Li coated on the garnet grains with homogeneous thickness, which provides large electrolyte/anode contact area. (FIG. 15e). By controlling the Li infiltration time, void space in the framework is retained for hosting additional Li from the cathode. The Li metal distributed on the interface in FIG. 15f between the dense and porous layers indicates full infiltration of Li metal throughout the porous framework. Li metal did not penetrate through the dense layer of garnet during the infusing process as confirmed by concurrent investigations. The 3D lithium metal framework introduced by the porous-dense garnet provides an integration of Li anode and SSE with high mechanical stability and ionic conductivity, applicable for a high-energy Li metal battery.

FIG. 15. Morphologies of the bilayer garnet framework before and after Li metal infiltration. (a) Cross-sectional SEM image of the bilayer garnet with one dense and porous layer. The thicknesses of both layers are precisely controlled to achieve desired mechanical strength of the framework as well as the energy density of the integrated battery. Inset is a photo of the bilayer garnet disk. (b) Magnified SEM image of the porous layer of the framework. (c) Magnified SEM image of the interface between the dense and porous layers, indicating continuous integration of the two layers. (d) Cross-sectional SEM image of a bilayer garnet with Li metal infiltrated inside. The porous layer is infiltrated with Li metal but the dense layer is pristine. Inset is an image of the bilayer garnet disk after Li metal infiltration. (e) Back-scattering SEM image of the porous layer infused with Li metal and retaining some void space. (f) Back-scattering SEM image of the interface between the dense and porous layers with Li metal. The corresponding secondary electron SEM image is provided as FIG. 21.

Figure 16:
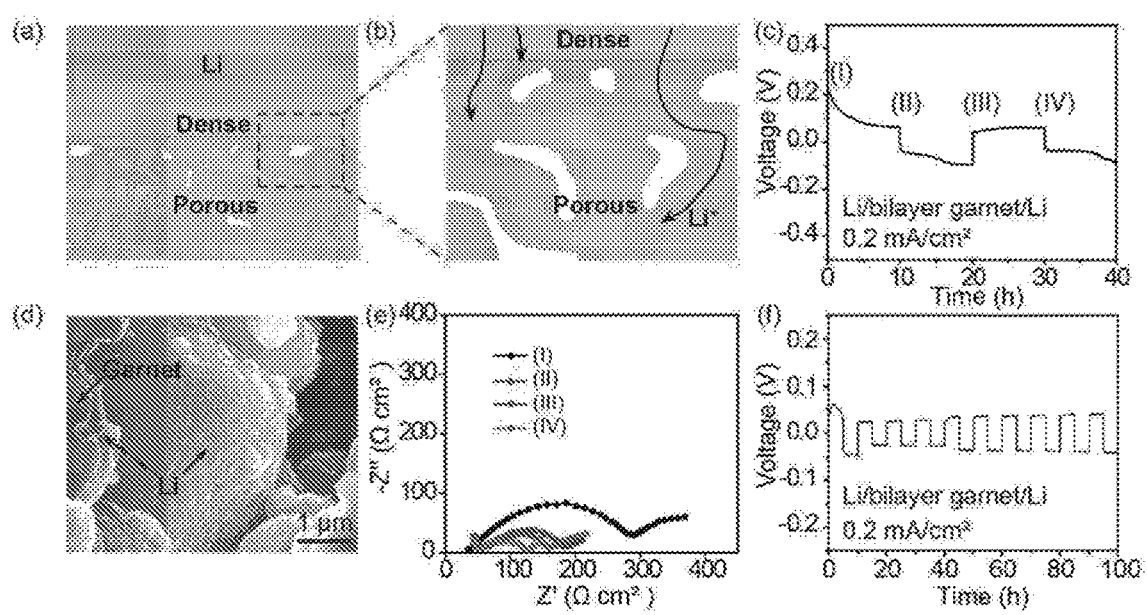
FIG. 16. Electrochemical characterizations of the Li metal anode inside a bilayer garnet framework. (a) Schematic of a cell with Li metal foil laminated on the dense side of the bilayer framework with a gel interlayer. (b) An inset showing the flow of Li while charging the cell. Li ions are transferred through the framework and deposited on the interface between porous garnet and Li metal. When discharging, $Li^+$ ions move in the opposite direction. (c) The voltage profile from galvanostatic cycling of the cell at 0.2 $mA/cm^2$ current density. The cell is firstly charged to plate Li metal on the porous garnet framework, then discharged to strip Li metal out. (d) SEM image of a garnet grain in the porous layer coated with Li metal after the first plating process. The deposited Li metal improves the contact between the solid-state electrolyte and Li anode, and causes a decrease in the charge transfer resistance. (e) Impedance of the cell at different states-of-charge. (f) Long term galvanostatic cycling of the half-cell with 0.2 $mA/cm^2$ current density and 5 h step time exhibiting a stable overpotential.

The electrochemical performance of the Li metal anode in the bilayer garnet framework is presented in FIG. 16. To examine the stability of the framework, a Li/Li cell is obtained by coating Li metal foil on the dense side of the bilayer garnet with a gel interlayer to ensure constant interfacial resistance (FIG. 16a). As shown in FIG. 16b, the inset of FIG. 16a, the cell was first charged to plate Li metal into the framework, and then discharged to strip the same amount of Li out to simulate the kinetics of a Li/NNIC battery (FIG. 16b). FIG. 16c shows the voltage profile of the cell cycled at 0.2 mA/cm$^2$ current density, with 2 mAh/cm$^2$ Li metal reversibly transferred in each cycle. In the first plating process (0~10 h), the overpotential gradually decreased from 0.25 V to 0.08 V, due to the plated lithium metal improving the contact between the lithium and SSE. After this process, the overpotential is maintained between 0.08 V and 0.12 V, thereby indicating stable contact between the Li metal and porous garnet during the subsequent stripping and plating cycles. FIG. 16d shows the morphology of the Li metal in the porous framework after the first plating process, with a fully wetted interface because of the freshly deposited Li metal. Electrochemical impedance spectroscopy (EIS) measurements of the cell (FIG. 16e) at different states-of-charge in the first two cycles demonstrate the interfacial resistance changing between the hosted Li metal and the garnet framework. In each impedance curve, the diameter of the semi-circle in the middle frequency region indicates the total interfacial charge-transfer resistance ($R_{ct}$) of the cell, including the resistances of Li metal/porous garnet and the Li metal foil/dense garnet interfaces. Because a stable Li/dense garnet interfacial resistance is maintained by the gel interlayer, the change in $R_{ct}$ is a result of variation between the hosted Li metal and the porous garnet. The $R_{ct}$ decreased from 300 to 130 Ωcm$^2$ in the first plating process and varied between 80 and 130 Ωcm$^2$ in the following cycling process. The variation of the $R_{ct}$ can be attributed to the change of lithium metal morphology in the porous garnet framework, which further leads to the change in contact with the SSE. In FIG. 16f, galvanostatic cycling with a 0.2 mA/cm$^2$ current density and 5 hours per step shows a stable overpotential for 100 hours after the initial cycle. The flat voltage curve indicates a stable contacting between Li metal and the porous garnet during long time Li plating and stripping process.

FIG. 16. Electrochemical characterizations of the Li metal anode inside a bilayer garnet framework. (a) Schematic of a cell with Li metal foil laminated on the dense side of the bilayer framework with a gel interlayer. (b) An inset showing the flow of Li while charging the cell. Li ions are transferred through the framework and deposited on the interface between porous garnet and Li metal. When discharging, Li$^+$ ions move in the opposite direction. (c) The voltage profile from galvanostatic cycling of the cell at 0.2 mA/cm$^2$ current density. The cell is firstly charged to plate Li metal on the porous garnet framework, then discharged to strip Li metal out. (d) SEM image of a garnet grain in the porous layer coated with Li metal after the first plating process. The deposited Li metal improves the contact between the solid-state electrolyte and Li anode, and causes a decrease in the charge transfer resistance. (e) Impedance of the cell at different states-of-charge. (t) Long term galvanostatic cycling of the half-cell with 0.2 mA/cm$^2$ current density and 5 h step time exhibiting a stable overpotential.

A Li metal battery was developed by laminating the integrated bilayer framework with NMC cathodes. NMC cathodes with high mass loading (14 and 32 mg/cm$^2$) were applied to evaluate the stability of the framework in full cells as well as develop solid-state batteries with high energy densities. FIG. 17a shows the voltage profile of a cell cycled at 0.1 C rate (based on the cathode mass loading) and 0.2 mA/cm$^2$ current density. In the first cycle, the Coulombic efficiency is low due to the activation process. After the first cycle, the battery shows typical cycling performance with stable discharge capacities around 175 mAh/g and Coulombic efficiencies over 97% while cycling due to the electrochemical stability between Li and garnet as well as the high reversibility of Li metal in the framework (FIG. 17b). The gravimetric and volumetric energy densities of this battery are 242 Wh/kg and 733 Wh/L, calculated based on the total mass and volume of the battery. Because of the high Li capacity (totally 8 mAh/cm$^2$) of the porous layer, the bilayer framework is compatible with cathodes with an even higher mass loading. To demonstrate a battery with a higher energy density, we developed a cell with an infiltrated bilayer framework and a NMC cathode with 32 mg/cm$^2$ active mass loading. The voltage profile of the battery in FIG. 17c features 173 mAh/g cathode specific capacity and 5 mAh/cm$^2$ areal specific capacity with smooth voltage curves. This result demonstrates the high Li metal storage capability of the bilayer framework due to the porous structure. With this highly loaded cathode, the battery can achieve high gravimetric and volumetric energy densities of 330 Wh/kg and 972 Wh/L, respectively. FIG. 17d compares the energy densities of the Li/NMC battery of the present disclosure to other solid-state Li metal batteries with dense garnet electrolytes. The garnet electrolytes in these batteries from the art (150~400 μm thick) provided low energy densities due to the high mass ratios of the electrolyte and the limited cathode mass loadings. With our bilayer garnet framework, the gravimetric and volumetric energy densities can be improved because of the reduced electrolyte mass, the highly integrated structure, and the application of high-mass-loading cathodes. The bilayer framework also provides a higher energy density than batteries with liquid electrolyte, because of the safe application of a high-energy Li metal anode and the well-controlled garnet structure.

Figure 17:
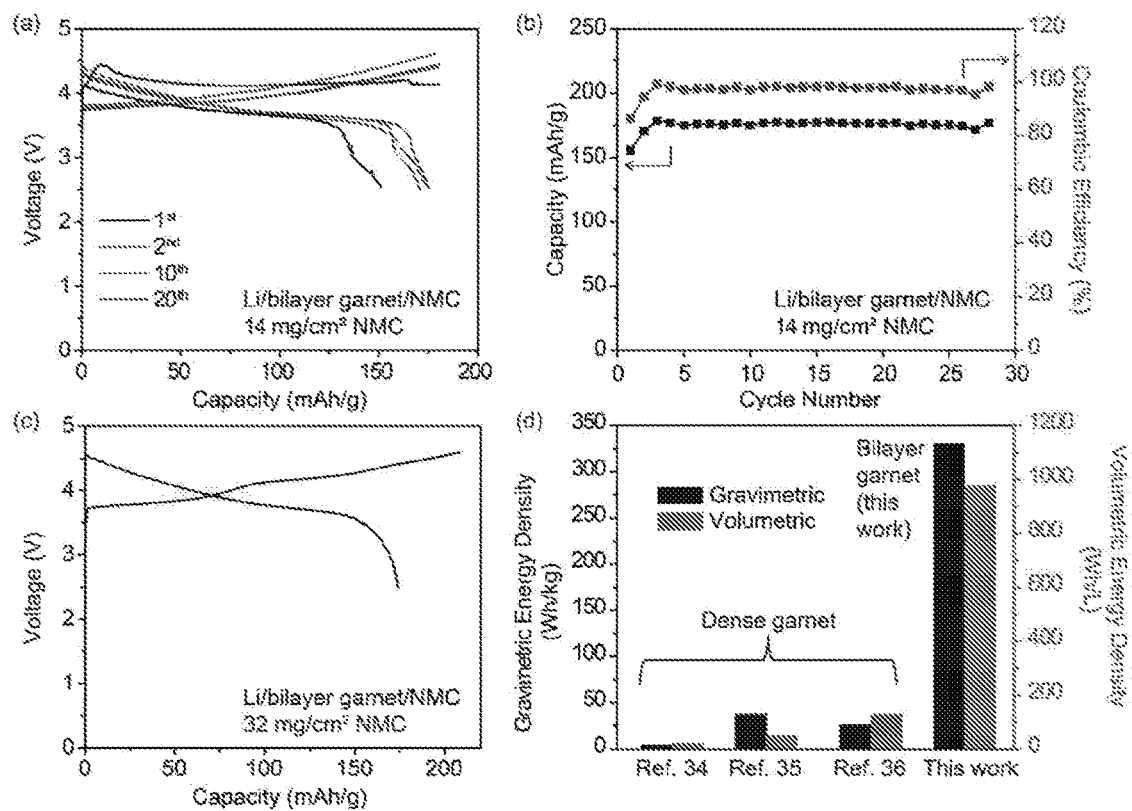
FIG. 17. Electrochemical characterizations of Li-NMC batteries with bilayer garnet frameworks. (a-b) Voltage profile and cycling performance of the battery composed of a Li metal anode in the bilayer garnet framework and a 14 $mg/cm^2$ NMC cathode. (c) Voltage profile of the battery consisting of an infiltrated bilayer garnet framework and NMC cathode with 32 $mg/cm^2$ mass loading. (d) Comparison of the energy densities of Li metal batteries based on dense garnet and the battery with bilayer garnet in our work.

FIG. 17. Electrochemical characterizations of Li-NMC batteries with bilayer garnet frameworks. (a-b) Voltage profile and cycling performance of the battery composed of a Li metal anode in the bilayer garnet framework and a 14 mg/cm² NMC cathode. (c) Voltage profile of the battery consisting of an infiltrated bilayer garnet framework and NMC cathode with 32 mg/cm² mass loading. (d) Comparison of the energy densities of Li metal batteries based on dense garnet and the battery with bilayer garnet in our work.

Figure 18:
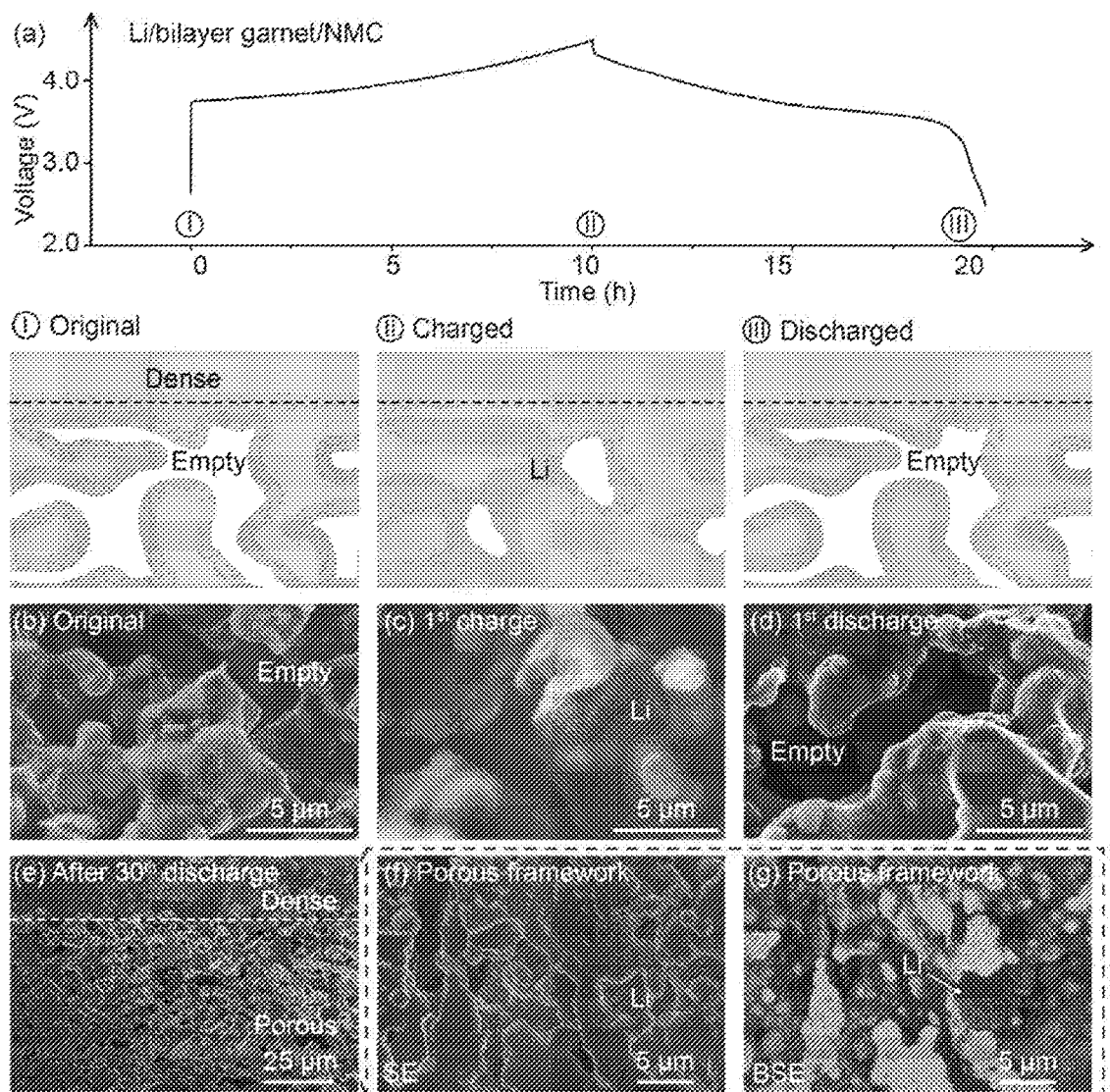
FIG. 18. Morphologies of the bilayer garnet framework after battery cycling. (a) Schematic of Li metal distribution in the garnet framework at original, charged, and discharged states of a battery. The garnet framework provides a constant volume and high reversibility of the Li metal anode during cycling. (b-d) SEM images of the porous framework with Li metal inside at different states-of-charge during the first cycle. (b) Li metal in the porous framework before cycling. (c) Li metal in porous framework after the first charging process. (d) Li metal in porous framework after the first discharging process. (e-g) SEM images of the bilayer framework with Li metal inside after 30 cycles of the Li/NMC battery, indicating the stable structure of the framework and the homogeneous distribution of Li metal after cycling. (e) is low magnification view of the bilayer framework with Li metal inside. (f) and (g) are the high magnification view of the porous framework by secondary electron and back scattering electron SEM.

FIG. 18 presents the morphology of lithium metal in the bilayer framework after cycling. FIG. 18a is a schematic of the Li metal distribution in the framework at charged and discharged states. Li metal is plated into the framework when the battery is charged, and stripped out when the battery discharged. The porous structure of the framework results in a constant volume of the integrated Li metal anode without mechanical degradation issues. FIGS. 17B-D show the morphologies of the integrated Li metal in the porous framework at different states-of-charge in the first cycle. The porous garnet is fully coated with Li metal before cycling, with void space inside the framework to host additional Li from the cathode side. FIG. 18c shows that after charging, the deposited Li metal occupies the empty space in the framework. In FIG. 18d, after a full cycle, the deposited Li returns to the cathode and generates empty space again in the porous layer. The framework is still coated with Li metal after discharging, providing a constant garnet/Li interface with stable resistance. FIG. 18e shows the morphology of the bilayer garnet framework with Li metal after thirty cycles of the Li/NMC battery at a 0.1 C rate and 0.2 mA/cm² current density. The structure of the bilayer framework remains stable after long term cycling because of the electrochemical stability of garnet against Li metal and the porous framework for reversible cycling. Li metal is distributed inside the porous layer and does not penetrate the dense layer while cycling which indicates promising cycling stability and improved safety against thermal runaway. FIG. 18f-g are the zoomed-in views of FIG. 18e which demonstrate the uniform distribution of Li metal in the porous framework after thirty cycles. This interface improvement can be valuable during repeated stripping and plating processes so the surface stays smooth with no dendrite structures. The isolation of the Li metal anode from the gel interlayer and the electrochemical stability of garnet are also worth noting in these successful full cell demonstrations.

FIG. 18. Morphologies of the bilayer garnet framework after battery cycling. (a) Schematic of Li metal distribution in the garnet framework at original, charged, and discharged states of a battery. The garnet framework provides a constant volume and high reversibility of the Li metal anode during cycling. (b-d) SEM images of the porous framework with Li metal inside at different states-of-charge during the first cycle. (b) Li metal in the porous framework before cycling. (c) Li metal in porous framework after the first charging process. (d) Li metal in porous framework after the first discharging process. (e-g) SEM images of the bilayer framework with Li metal inside after 30 cycles of the Li/NMC battery, indicating the stable structure of the framework and the homogeneous distribution of Li metal after cycling. (e) is low magnification view of the bilayer framework with Li metal inside. (f) and (g) are the high magnification view of the porous framework by secondary electron and back scattering electron SEM.

As disclosed herein is an ionically conductive porous-dense bilayer framework based on garnet SSE for solid-state Li metal batteries with high energy density, a simple fabrication process, and stable cycling performance. The porous layer of the framework provides a mechanically stable host for Li metal with improved contact area between the metal anode and electrolyte. The garnet framework with high mechanical stability acts as a stable host for the Li metal anode and improves the cycling stability of the battery. The large contact area between Li and garnet reduces the local current density on the interface, producing a small overpotential and homogeneous distribution of Li metal after battery cycling. The dense layer of garnet provides an ionic pathway between the Li metal anode and the cathode, as well as blocking Li metal dendrite penetration and preventing potential short-circuits. Li metal batteries with high mass-loading NMC cathodes (14 and 30 mg/cm 2) were demonstrated with bilayer SSE frameworks to achieve high energy densities (242 and 330 W h/kg, respectively) because of the high capacity of Li in the porous garnet and the well-controlled structure of garnet with a small areal-specific mass. Based on this bilayer ionic conductive framework, Li metal batteries with different types of cathodes (e.g. Li compound, sulfur, air) can be potentially developed, by directly coating the cathode on the dense plane of the bilayer framework. This work demonstrates solid-state Li metal batteries with high energy densities and good cyclability based on bilayer garnet frameworks, and high mass-loading cathodes.

Methods—3

Fabrication of Bilayer Garnet Framework

The $Li_{6.75}La_{2.75}Zr_{1.75}Ca_{0.25}Nb_{0.25}O_{12}$ powders were synthesized by conventional solid-state reaction. The starting materials were LiOH (99%, Alfa Aesar), $La_2O_3$ (99.9%, Alfa Aesar), $CaCO_3$ (99.9%, Sigma Aldrich), $ZrO_2$ (99.9%, Alfa Aesar) and $Nb_2O_5$ (99.99%, Alfa Aesar). Stoichiometric amounts of the raw materials were mixed by ball-milling and calcined at 900° C. for 12 h.

Tape casting was used to fabricate the bilayer framework; dense and porous layers were fabricated separately and then laminated into a bilayer tape. The thickness of each individual layer was well controlled. The $Li_{6.75}La_{2.75}Zr_{1.75}Ca_{0.25}Nb_{0.25}O_{12}$ powders were mixed with fish oil, polyvinyl butyral (PVB) and butyl benzyl phthalate (BBP) in toluene and isopropanol (IPA) to prepare the slurry, which was casted by doctor blade on Mylar sheet. To fabricate the porous tape, poly(methyl methacrylate) (PMMA) spheres were added to the slurry. The pore size of the porous layer can be controlled by the size of polymer based pore formers and its content. The tapes were laminated and hot-pressed to form a bilayer structure. Then it was sintered at 1100° C. for 6 h.

Integration of Li Metal Anode in Bilayer Garnet Framework

A layer of zinc oxide (ZnO) with 20 nm thickness is coated on the garnet surface by atomic layer deposition (ALD) method with Beneq TFS 500 ALD system. The ALD process is in vacuum condition and at 150° C. temperature. $N_2$ gas functions as the carrier gas in the whole process. Precursors diethyl zinc (DEZ) and water are used for the ALD process.

After ZnO coating, Li metal was infused into the porous garnet by the following method. A 30 μm thick foil of Li metal was coated on the porous side of the garnet. After this the garnet and Li is heated together at 250° C. for 5 min in a glovebox filled with argon, to let Li metal form alloy with ZnO and fully infuse into the porous garnet.

Characterizations of Materials

SEM images were performed with a Hitachi SU-70 analytical scanning electron microscope. Phase analysis of the garnet was performed by X-ray diffraction (XRD) on a D8 Advanced with LynxEye and SolX (Bruker AXS, WI, USA) using a Cu Kα radiation source operated at 40 kV and 40 mA.

Battery Assembly

Commercial NMC cathode films from MTI Corporation with 14 mg/cm² active mass loading and 45 μm thickness were applied for the battery. The interlayer between cathode and garnet is a PVDF-HFP based gel electrolyte with 10 μm thickness, which is soaked in electrolyte (1M LiPF$_6$ in ethylene carbonate: diethyl carbonate, 1:1 volume ratio) before assembly. High-loading NMC cathodes were fabricated by casting cathode slurry on Al film. The slurry is composed of NMC particles, carbon black, and polyvinylidene difluoride (PVDF) binders (8.5:1:0.5 mass ratio) in N-Methyl-2-pyrrolidone solvents. The casted cathode is dried in an oven at 90° C. for 12 h. The cathode has 32 mg/cm² active mass loading and 150 μm thickness. To make a full cell, the gel electrolyte and NMC cathode were laminated on the dense side of the bilayer garnet with Li metal inside. After assembly, 2~4 μL/cm² liquid electrolyte (1 M LiPF$_6$ in ethylene carbonate: diethyl carbonate, 1:1 volume ratio) was injected inside the cathode to ensure ionic conductivity. The combined structure was assembled in a CR 2032 coin cell case. Full cell assembly is done in a glovebox filled with argon.

Electrochemical Tests.

All electrochemical tests were performed by Bio-Logic electrochemical tester. Electrochemical impedance spectroscopy tests were performed with voltage amplitude 10 mV and frequency region 1 MHz~0.1 Hz. Galvanostatic cycling of the Li/Li cells with bilayer garnet is performed with a current density of 0.2 mA/cm² and a time period of 10 or 20 hours. For the full cell charge and discharge tests with 14 mg/cm² NMC cathode, both voltage (2.5~4.5 V) and capacity (180 mAh/g for NMC cathode) limits were set. For the full cell charge and discharge tests with 32 mg/cm² NMC cathode, a voltage range between 2.5 V and 4.6 V was set.

Figure 19:
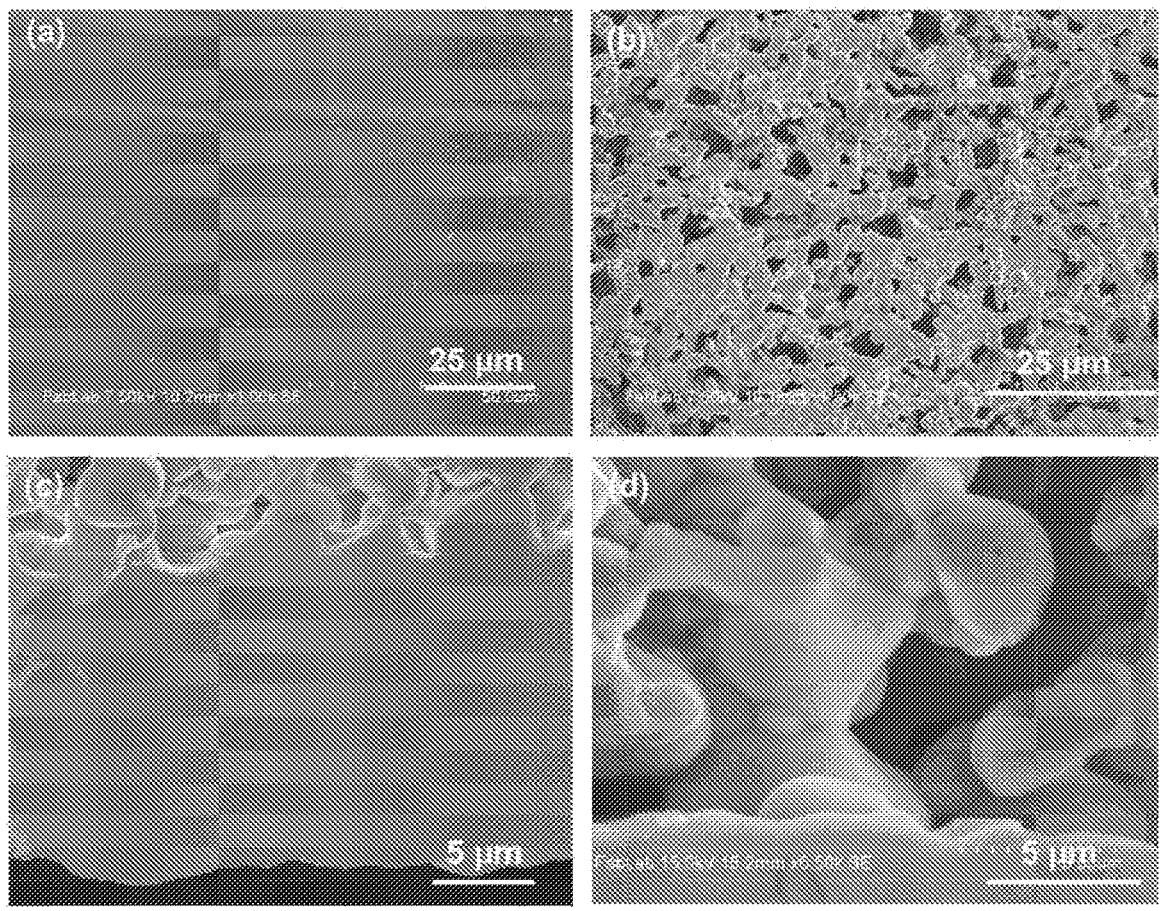
FIG. 19. Additional scanning electron microscope (SEM) images of the bilayer garnet (a) Top view of the porous side of garnet, with open holes enabling Li metal infusion. (b) Top view of the dense side of garnet, with high densification for preventing short-circuits and high flatness for integrating with cathode. (c) A cross-sectional view of the dense layer with high densification. (d) Interface between the porous layer and the dense layer, indicating the good connection between the two layers by co-sintering.

FIG. 19. Additional scanning electron microscope (SEM) images of the bilayer garnet (a) Top view of the porous side of garnet, with open holes enabling Li metal infusion. (b) Top view of the dense side of garnet, with high densification for preventing short-circuits and high flatness for integrating with cathode. (c) A cross-sectional view of the dense layer with high densification. (d) Interface between the porous layer and the dense layer, indicating the good connection between the two layers by co-sintering.

Figure 20:
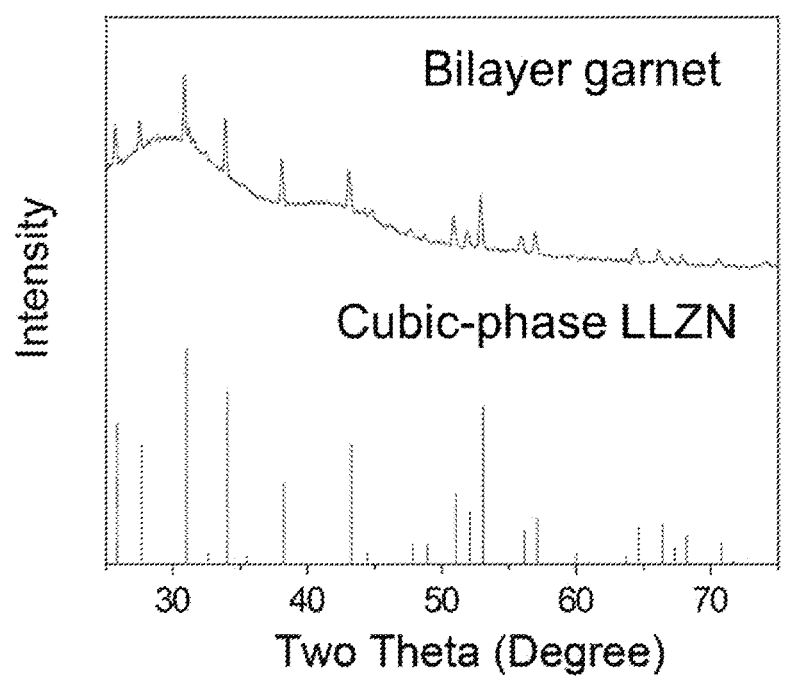
FIG. 20. X-ray diffraction plot of bilayer garnet $Li_{6.75}La_{2.75}Zr_{1.75}Ca_{0.25}Nb_{0.25}O_{12}$, compared with the standard cubic-phase $Li_5La_3Nb_2O_{12}$ (JCPDS 80-0457). The coincidence demonstrates cubic garnet phase of the bilayer framework.

FIG. 20. X-ray diffraction plot of bilayer garnet $Li_{6.75}La_{2.75}Zr_{1.75}Ca_{0.25}Nb_{0.25}O_{12}$, compared with the standard cubic-phase $Li_5La_3Nb_2O_{12}$ (JCPDS 80-0457). The coincidence demonstrates cubic garnet phase of the bilayer framework.

FIG. 21. The corresponding secondary electrons SEM image of FIG. 14f showing the Li metal distribution at the porous/dense interface after Li infiltration.

Calculations of battery energy densities with the bilayer garnet framework and NMC cathodes (14 and 32 mg/cm²).

Figure 22:
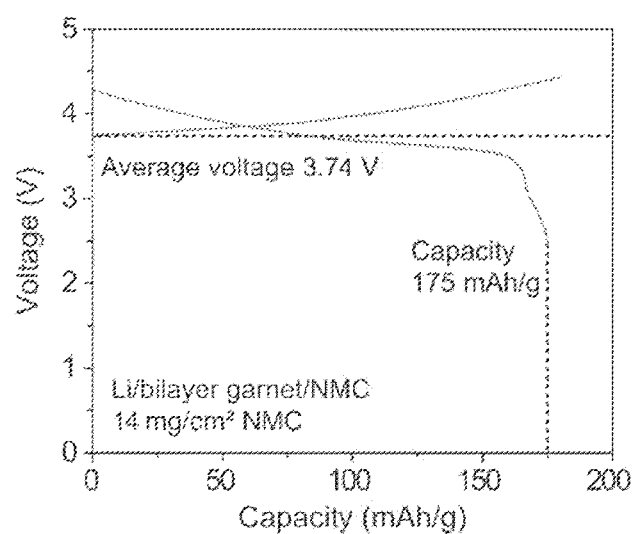
FIG. 22. Discharge capacity and average voltage of the Li/bilayer garnet/NMC battery with 14 $mg/cm^2$ cathode mass loading, for energy density calculations.

FIG. 22. Discharge capacity and average voltage of the Li/bilayer garnet/NMC battery with 14 mg/cm² cathode mass loading, for energy density calculations.

Tables

TABLE S1

Energy density of Li/bilayer garnet/NMC battery with commercial cathode.

| Component | Thickness (μm) | Material | Density (g/cm³) | Mass (mg/cm²) | Specific Capacity (mAh/g) | Capacity (mAh/cm²) |
|---|---|---|---|---|---|---|
| Cathode | 45 | NMC 94% | N/A | 14.0 | 175 | 2.45 |
| | | PVDF 3% | | 0.45 | N/A | N/A |
| | | Carbon 3% | | 0.45 | | |
| | | Additional electrolyte 2 μL/cm² | 1.26 | 2.5 | | |
| Electrolyte | 10 | Gel | 1.64 | 1.6 | | |
| | 20 | Garnet | 4.97 | 9.9 | | |
| Anode | 50 | Garnet 30% | 4.97 | 7.5 | | |
| | | Li 60% | 0.54 | 1.6 | | |
| Total | 125 | N/A | N/A | 38.0 | | |
| | Average Voltage 3.74 V | | | | Energy Density | 241 Wh/kg 733 Wh/L |

Figure 23:
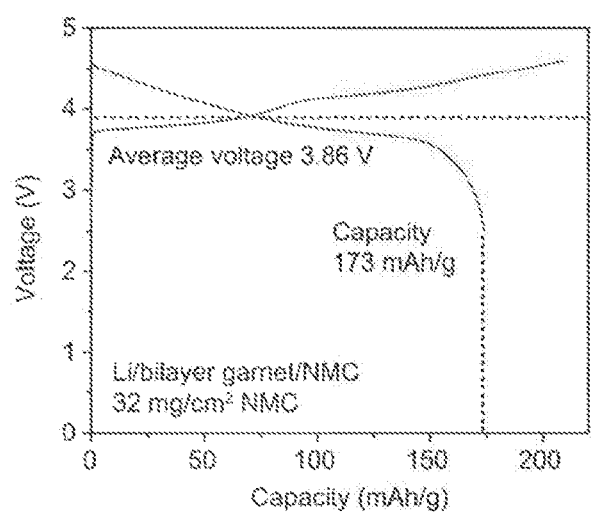
FIG. 23. Discharge capacity and average voltage of the Li/bilayer garnet/NMC battery with 32 $mg/cm2$ cathode mass loading, for energy density calculations.

FIG. 23. Discharge capacity and average voltage of the Li/bilayer garnet/NMC battery with 32 mg/cm² cathode mass loading, for energy density calculations.

TABLE S2

Energy density of Li/bilayer garnet/NMC battery with high loading cathode.

| Component | Thickness (μm) | Material | Density (g/cm³) | Mass (mg/cm²) | Specific Capacity (mAh/g) | Capacity (mAh/cm²) |
|---|---|---|---|---|---|---|
| Cathode | 130 | NMC 85% | N/A | 32.0 | 173 | 5.54 |
| | | PVDF 5% | | 1.9 | N/A | N/A |
| | | Carbon 10% | | 3.8 | | |
| | | Additional electrolyte 4 μL/cm² | 1.26 | 5.0 | | |
| Electrolyte | 20 | Gel | 1.64 | 3.3 | | |
| | 20 | Garnet | 4.97 | 9.9 | | |

TABLE S2-continued

Energy density of Li/bilayer garnet/NMC battery with high loading cathode.

| Component | Thickness (μm) | Material | Density (g/cm³) | Mass (mg/cm²) | Specific Capacity (mAh/g) | Capacity (mAh/cm²) |
|---|---|---|---|---|---|---|
| Anode | 50 | Garnet 30% | 4.97 | 7.5 | | |
| | | Li 60% | 0.54 | 1.6 | | |
| Total | 220 | N/A | N/A | 65.0 | | |
| | Average Voltage 3.86 V | | | | Energy Density | 329 Wh/kg
972 Wh/L |

Estimated calculation of the energy densities of batteries with dense garnet in FIG. 16*d*. The thicknesses and electrode loadings are reported in publications or adopted from commonly used cathode parameters.

TABLE 20

Energy density of battery with dense garnet from literature

| Component | Thickness (μm) | Material | Density (g/cm³) | Mass (mg/cm²) | Specific Capacity (mAh/g) | Capacity (mAh/cm²) |
|---|---|---|---|---|---|---|
| Cathode | 20 | LiFePO$_4$ | N/A | 0.6 | 140 | 0.084 |
| Electrolyte | 5 | Gel | 1.64 | 0.8 | N/A | |
| | 200 | Garnet | 4.97 | 99.4 | | |
| Anode | 20 | Li | 0.54 | 1.1 | | |
| Total | 245 | N/A | N/A | 101.9 | | |
| | Average Voltage 3.4 V | | | | Energy density | 3 Wh/kg
12 Wh/L |

TABLE S4

Energy density of battery with dense garnet in literature

| Component | Thickness (μm) | Material | Density (g/cm³) | Mass (mg/cm²) | Specific Capacity (mAh/g) | Capacity (mAh/cm²) |
|---|---|---|---|---|---|---|
| Cathode | 45 | LiFePO$_4$ | N/A | 5 | 140 | 0.7 |
| Electrolyte | 100 | PEO | 1.2 | 12 | N/A | |
| | 400 | Garnet | 4.97 | 198.8 | | |
| Anode | 20 | Li | 0.54 | 1.1 | | |
| Total | 565 | N/A | N/A | 216.9 | | |
| | Average Voltage 3.4 V | | | | Energy density | 11 Wh/kg
42 Wh/L |

TABLE S5

Energy density of battery with dense garnet in literature

| Component | Thickness (μm) | Material | Density (g/cm³) | Mass (mg/cm²) | Specific Capacity (mAh/g) | Capacity (mAh/cm²) |
|---|---|---|---|---|---|---|
| Cathode | 40 | LiFeMnO$_4$ | N/A | 2 | 105 | 0.21 |
| Electrolyte | 150 | Garnet | 4.97 | 75 | N/A | |
| Anode | 20 | Li | 0.54 | 1.1 | | |
| Total | 210 | N/A | N/A | 78.1 | | |
| | Average Voltage 3.4 V | | | | Energy density | 12.1 Wh/kg
45 Wh/L |

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

As used herein, the words "approximately", "about", "substantially", "near" and other similar words and phrasings are to be understood by a person of skill in the art as allowing for an amount of variation not substantially affecting the working of the device, example or embodiment. In those situations where further guidance is necessary, the degree of variation should be understood as being 10% or less. Use of the word "or" or related words is intended to be inclusive and is equivalent to the expression "and/or," unless the context clearly dictates otherwise.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Use of the word "or" should be understood to also include the meaning "and", except where the context indicates otherwise. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims.

The invention claimed is:

1. A lithium-ion battery comprising:
    an anode assembly comprising:
        an anode comprising a first porous ceramic matrix having pores; and
        a ceramic separator layer affixed directly or indirectly to the anode;
    a cathode;
    an anode-side current collector contacting the anode;
    anode active material comprising lithium located within the pores or cathode active material located within the cathode: and
    an electrically conductive coating on the pores that extends only part-way from the anode-side current collector toward the separator layer;
    wherein,
        the ceramic separator layer is located between the anode and the cathode;
        no electrically conductive coating on the pores contacts the separator layer, and
        in a fully charged state, lithium active material in the anode does not contact the separator layer.

2. The lithium-ion battery of claim 1, wherein the anode active material is lithium.

3. The lithium-ion battery of claim 1, wherein the first porous ceramic matrix and the ceramic separator layer are lithium garnet.

4. The lithium-ion battery of claim 1, wherein the electrically conductive coating is a carbon material.

5. The lithium-ion battery of claim 4, wherein the electrically conductive coating is selected from the group consisting of graphite, carbon black and carbon nanotubes.

6. The lithium-ion battery of claim 1, wherein the electrically conductive coating is a metal.

7. The lithium-ion battery of claim 1, wherein the electrically conductive coating is a semiconductor.

8. The lithium-ion battery of claim 1, wherein the electrically conductive coating is in electrical communication with the anode-side current collector when the lithium-ion battery is in a fully discharged state.

9. The lithium-ion battery of claim 1, wherein the first porous ceramic matrix and the separator layer are made integral to one another.

10. The lithium-ion battery of claim 1, wherein the cathode comprises a liquid or gel electrolyte.

11. The lithium-ion battery of claim 1, wherein the cathode comprises:
    a second porous ceramic matrix having pores, the first porous ceramic matrix and the second ceramic matrix are of the same or different ceramic material.

12. A method of making the lithium-ion battery of claim 1 comprising:
    attaching the cathode to a surface the anode assembly;
    attaching the anode-side current collector;
    attaching the cathode-side current collector; and
    charging the lithium-ion battery.

13. The method of claim 12, wherein an interlayer is located between the cathode and the anode assembly.

14. The method of claim 13, wherein the interlayer is a gel.

15. A method of operating the lithium-ion battery of claim 1 comprising:
    charging the lithium-ion battery whereby lithium ions move from the cathode and are plated in the pores of the anode progressively from proximate the anode-side current collector to proximate the ceramic separator layer.

16. A method of operating the lithium-ion battery of claim 1 comprising:
    charging the lithium-ion battery whereby lithium ions move from the cathode and are plated in the pores of the anode progressively from proximate the electronically conductive coating to proximate the ceramic separator layer.

17. A lithium-ion battery comprising:
    an anode assembly comprising:
        an anode comprising a first porous ceramic matrix having pores; and
        a ceramic separator layer affixed directly to the anode;
    a cathode;
    an anode-side current collector contacting the anode;
    anode active material comprising lithium located within the pores or cathode active material located within the cathode; and
    an electrically conductive coating on the pores that extends part-way from the anode-side current collector toward the separator layer;
    wherein,
        the ceramic separator layer is located between the anode and the cathode,
        no electrically conductive coating on the pores contacts the separator layer, and
        in a fully charged state, lithium active material in the anode does not contact the separator layer.

18. A lithium-ion battery comprising:
an anode assembly comprising:
  an anode comprising a first porous ceramic matrix having pores; and
  a ceramic separator layer affixed directly to the anode;
a cathode;
an anode-side current collector contacting the anode;
anode active material comprising lithium located within the pores or cathode active material located within the cathode; and
an electrically conductive coating on the pores;
wherein,
  the ceramic separator layer is located between the anode and the cathode,
  no electrically conductive coating on the pores contacts the separator layer, and
  in a fully charged state, lithium active material in the anode does not contact the separator layer.

\* \* \* \* \*